(12) United States Patent
Petrenko

(10) Patent No.: US 6,818,831 B2
(45) Date of Patent: Nov. 16, 2004

(54) SYSTEMS AND METHODS FOR MODIFYING ICE ADHESION STRENGTH

(75) Inventor: Victor E. Petrenko, Hanover, NH (US)

(73) Assignee: The Trustees of Dartmouth College, Hanover, NH (US)

(*) Notice: Subject to any disclaimer, the term of this patent is extended or adjusted under 35 U.S.C. 154(b) by 91 days.

(21) Appl. No.: 10/222,403

(22) Filed: Aug. 16, 2002

(65) Prior Publication Data

US 2003/0024727 A1 Feb. 6, 2003

Related U.S. Application Data

(60) Continuation of application No. 09/426,685, filed on Oct. 25, 1999, now Pat. No. 6,563,053, which is a division of application No. 09/094,779, filed on Jun. 15, 1998, now Pat. No. 6,027,075.
(60) Provisional application No. 60/049,790, filed on Jun. 16, 1997, provisional application No. 60/079,623, filed on Mar. 27, 1998, and provisional application No. 60/079,915, filed on Mar. 30, 1998.

(51) Int. Cl.$^7$ .................................................. H01B 7/00
(52) U.S. Cl. .............................. 174/110 R; 244/134 R
(58) Field of Search .......................... 174/36, 102 SC, 174/110 R, 102 P, 105 R; 244/134 R

(56) References Cited

U.S. PATENT DOCUMENTS

| | | |
|---|---|---|
| 1,157,344 A | 10/1915 | Thomson |
| 1,656,329 A | 1/1928 | Sievert et al. |
| 2,870,311 A | 1/1959 | Greenfield et al. |
| 3,790,752 A | 2/1974 | Boaz et al. |
| 4,137,447 A | 1/1979 | Boaz |
| 4,278,875 A | 7/1981 | Bain |
| 4,321,296 A | 3/1982 | Rougier |

(List continued on next page.)

OTHER PUBLICATIONS

Charles Jordan, Examiner, U.S. Patent Office, "International Search Report", U.S. Patent Office (Washington, D.C.), p. 1, (Nov. 3, 1998).

AIA 94–0714, "Interface Influences Upon Ice Adhesion to Airfoil Materials", by A. Reich, BFGoodrich Aerospace/De–icing Systems, Brecksville/Uniontown, OH (32$^{nd}$ Aerospace Sciences Meeting and Exhibit, Jan. 10–13, 1994), pp. 1–8.

"Icing Wind Tunnel", Meeting the Challenges of Ice Testing in a World–Class Facility—BFGoodrich Aerospace Ice Protection Systems, 4 pages, No date.

"New Goodrich Wind Tunnel Tests Advanced Aircraft De–Icing Systems", By Edward H. Phillips, Uniontown, Ohio, Aviation Week Magazine, Oct. 3, 1988, 3 pages, No date.

(List continued on next page.)

*Primary Examiner*—Chau N. Nguyen
(74) *Attorney, Agent, or Firm*—Curtis A. Vock; Lathrop & Gage, L.C.

(57) ABSTRACT

Systems and methods for modifying ice adhesion strength of ice adhered to an object. An electrode is electrically insulated from the object and a power source, e.g., a battery, is coupled to the object and the electrode. The source generates power to an interface between the ice and the object when the ice completes the circuit. The object is conductive or is doped as a semiconductor so that a voltage to the interface selectively modifies the ice adhesion strength. The strength can be increased or decreased relative to its static state (i.e., the state without applied voltage). Ice can, thus, be removed with less work. The system preferably includes an electrically insulating material disposed between the object and the electrode; the insulating material is substantially conformal to the object and the electrode. The invention also includes a ferroelectric material applied to power lines to melt or prevent ice formation.

19 Claims, 24 Drawing Sheets

U.S. PATENT DOCUMENTS

| | | |
|---|---|---|
| 4,330,703 A | 5/1982 | Horsma et al. |
| 4,773,976 A | 9/1988 | Vexler |
| 4,897,597 A | 1/1990 | Whitener |
| 4,985,313 A | 1/1991 | Penneck et al. |
| 5,144,962 A | 9/1992 | Counts et al. |
| 5,344,696 A | 9/1994 | Hastings et al. |
| 5,398,547 A | 3/1995 | Gerardi et al. |
| 5,496,989 A | 3/1996 | Bradford et al. |
| 5,551,288 A | 9/1996 | Geraldi et al. |
| 6,194,685 B1 | 2/2001 | Rutherford |
| 6,227,492 B1 | 5/2001 | Schellhase et al. |
| 6,279,856 B1 | 8/2001 | Rutherford et al. |
| 6,330,986 B1 | 12/2001 | Rutherford et al. |

OTHER PUBLICATIONS

"The Evolution of Ice Protection Creates a Revolution in Ice Detection", BFGoodrich Aerospace Ice Protection Systems, 2 pages, No date.

Generation of electric fields by ice and snow friction, by Victor F. Petrenko and Samuel C. Colbeck, (May 1, 1995), pp. 4518–4521.

The effect of static electric fields on ice friction, by Victor F. Petrenko (Jul. 15, 1994), pp. 1216–1219.

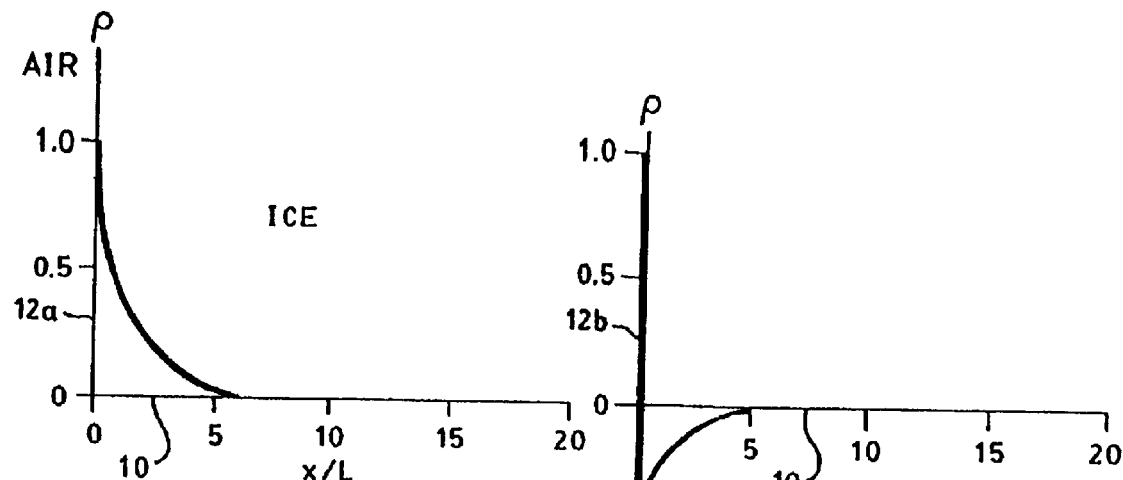
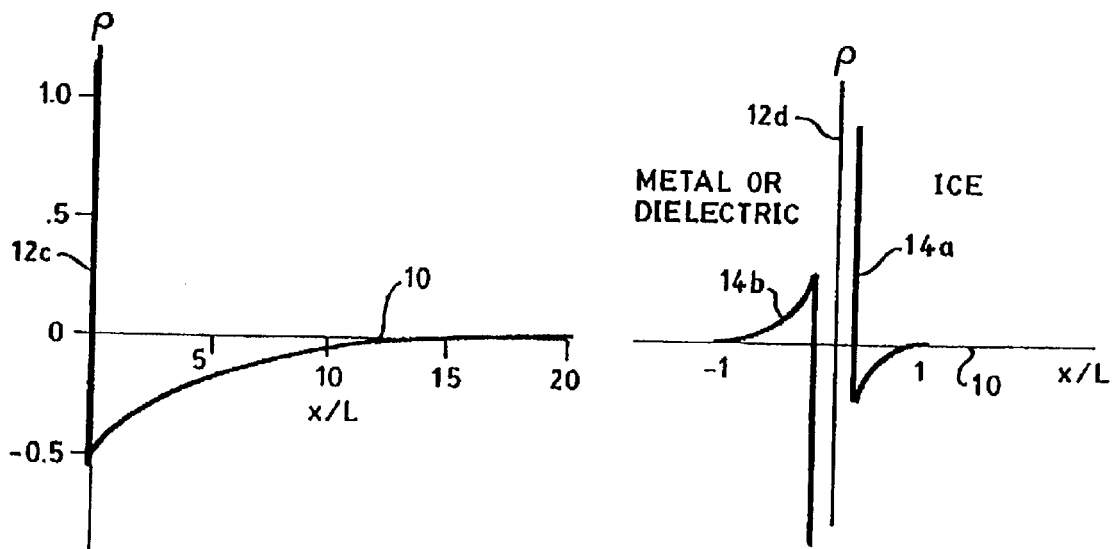

$\Theta_2 < \Theta_0 < \Theta_1$

SYSTEMS AND METHODS FOR MODIFYING ICE ADHESION STRENGTH

RELATED APPLICATIONS

This application is a continuation of commonly-owned and co-pending U.S. patent application Ser. No. 09/426,685, filed Oct. 25, 1999 now U.S. Pat. No. 6,563,053, which is a Divisional application of U.S. Pat No. 6,027,075 (previously U.S. patent application Ser. No. 09/094,779), filed Jun. 15, 1998, which claims benefit of 60/049,790, filed Jun. 16, 1997 and of 60/079,623 filed Mar. 27, 1998 and of 60/079, 915 filed Mar. 30, 1998, which applications are hereby incorporated by reference.

GOVERNMENT LICENSE RIGHTS

This invention was made in part with the support of the U.S. Government; the U.S. Government has certain rights in this invention as provided for by the terms of Grant #DAAH 04-95-1-0189 awarded by the Army Research Office and of Grant #MSS-9302792 awarded by the National Science Foundation.

FIELD OF THE INVENTION

The invention relates to methods and apparatus for modifying ice adhesion strength between ice and selected materials. More particularly, the invention relates to systems and methods which apply electrical energy to the interface between ice and such materials so as to either increase or decrease the ice adhesion strength to facilitate desired results.

BACKGROUND

Ice adhesion to certain surfaces causes many problems. For example, excessive ice accumulation on aircraft wings endangers the plane and its passengers. Ice on ship hulls creates navigational difficulties, the expenditure of additional power to navigate through water and ice, and certain unsafe conditions. The need to scrape ice that forms on automobile windshields is regarded by most adults as a bothersome and recurring chore; and any residual ice risks driver visibility and safety.

Icing and ice adhesion also causes problems with helicopter blades, and with public roads. Billions of dollars are spent on ice and snow removal and control. Ice also adheres to metals, plastics, glasses and ceramics, creating other day-to-day difficulties.

Icing on power lines is also problematic. Icing adds weight to the power lines which causes power outages, costing billions of dollars in direct and indirect costs.

In the prior art, methods for dealing with ice adhesion vary, though most techniques involve some form of scraping, melting or breaking. For example, the aircraft industry utilizes a de-icing solution such as Ethyl Glycol to douse aircraft wings so as to melt the ice thereon. This process is both costly and environmentally hazardous; however, the risk to passenger safety warrants its use. Other aircraft utilize a rubber tube aligned along the front of the aircraft wing, whereby the tube is periodically inflated to break any ice disposed thereon. Still other aircraft redirect jet engine heat onto the wing so as to melt the ice.

These prior art methods have limitations and difficulties. First, prop-propelled aircraft do not have jet engines. Secondly, rubber tubing on the front of aircraft wings is not aerodynamically efficient. Third, de-icing costs are extremely high, at $2500–$3500 per application; and it can be applied up to about ten times per day on some aircraft!

The above-referenced problems generally derive from the propensity of ice to stick and form onto surfaces. However, ice also creates difficulties in that it has an extremely low coefficient of friction. Each year, for example, ice on the roadway causes numerous automobile accidents, costing both human life and extensive property damage. If automobile tires gripped ice more efficiently, there would likely be fewer accidents.

It is, accordingly, an object of the invention to provide systems and methods which modify ice adhesion strength beneficially.

A further object of the invention is to provide systems for reducing ice adhesion on vehicle surfaces such as aircraft wings, ship hulls and windshields to facilitate ice removal.

Still another object of the invention is to provide systems for increasing the coefficient of friction between ice-clad roads and automobile tires, and between ice and other objects such as shoe soles and cross-country skis.

These and other objects will become apparent in the description which follows.

SUMMARY OF THE INVENTION

Certain of above-referenced problems would be lessened if the ice adhesion strength were decreased between the ice and the surface upon which the ice forms. For example, if the adhesion strength between the ice and an aircraft wing were decreased sufficiently, wind pressure, buffeting or light manual brushing would remove the ice from the wing. Similarly, scraping an automobile windshield so as to be free of ice would be much less difficult if the ice adhesion strength between the ice and the windshield were lessened.

Other above-referenced problems would be lessened if the ice adhesion strength between ice and surfaces in contact with the ice were increased. For example, if the ice adhesion strength were increased between automobile tires and icy roadways, then there would be less slippage and fewer accidents.

Ice has certain physical properties which allow the present invention to selectively modify the adhesion of ice to conductive (and semi-conductive) surfaces. First, ice is a protonic semiconductor, a small class of semiconductors whose charge carriers are protons rather than electrons. This phenomenon results from hydrogen bonding within the ice. Hydrogen bonding occurs because the hydrogen atoms of water molecules in ice share their electrons with an oxygen atom. Thus, the nucleus of the water molecule—uniquely a single proton—remains available to bond with adjacent water molecules.

Similar to typical electron-based semiconductors, ice is electrically conductive. While this electrical conductivity is generally weak, the conductivity can be altered by adding chemical agents that donate or accept extra charge-carrying particles, i.e., protons in the case of ice.

Another physical property of ice is its evaporability. Evaporability of a substance is a function of vapor pressure at the substance surface. In most materials, vapor pressure drops rapidly at the liquid-to-solid interface. In ice, however, there is virtually no change in vapor pressure at the liquid-to-solid interface. The reason for this is that the surface of ice is covered with a liquid-like layer ("LLL").

The LLL has important physical characteristics. First, the LLL is only nanometers thick. Second, it ranges in viscosity from almost water-like, at temperatures at or near to freezing, to very viscous at lower temperatures. Further, the LLL exists at temperatures as low as −100° C., and thus practically exists for most temperatures around the planet.

The LLL is also a major factor of ice adhesion strength. For example, if one brings the smooth surface of ice in contact with the smooth surface of an airplane wing, the actual area of contact between the two surfaces is on the order of one-thousandth of the total interface area between the two surfaces. The LLL functions as a wetting substance between the surfaces—the principal behind almost all adhesives—and substantially increases the effective contact area between the surfaces. This increase in contact area strongly affects ice adhesion.

The combination of the semiconductive properties of ice and the LLL allows one to selectively manipulate ice adhesion strength between ice and other surfaces. Generally, water molecules within a piece of ice are randomly oriented. On the surface, however, the molecules are substantially oriented in the same direction, either outward or inward. As a result, all their protons, and hence the positive charges, either face outward or inward.

While the exact mechanism is unknown, it is likely that the randomness of water molecules transitions to an ordered orientation within the LLL. However, the practical result of the ordering is that a high density of electrical charges, either positive or negative, occurs at the surface. Accordingly, if a charge is generated on the surface coming on contact with ice, it is possible to selectively modify the adhesion between the two surfaces. As like charges repel and opposites attract, an externally applied electrical bias at the interface of the ice and the other surface either reduces or enhances the adhesion between the ice and the surface.

In one aspect, the invention provides a power source connected to apply a DC voltage across the interface between ice and the surface upon which the ice forms. By way of example, the conductive surface can be an aircraft wing or a ship's hull (or even the paint applied to the structure). A first electrode connects with the surface; a nonconductive or electrically insulating material is applied as a grid over the surface; and a second electrode is formed by applying a conductive material, for example conductive paint, over the insulating material, but without contacting the surface. The surface area of the second electrode should be small as compared to the overall surface area protected by the system. By way of example, the surface area under protection (i.e., that area sought to be "ice-free") should be at least about ten times larger than the surface area of the second electrode.

One or more wires connect the second electrode to the power source; while one or more wires connect the first electrode to the power source. Ice forming over the surface and the conductive grid second electrode completes the circuit. A voltage is then applied to the circuit, selectively, which controllably modifies the ice adhesion strength of the ice with the surface.

A voltage regulator subsystem also preferably connects with the circuit so as to adjustably control the voltage applied across the interface and so as to achieve control over the ice adhesion strength. By way of example, ice made from different concentrations of ions can modify the optimum voltage for which the ice adhesion strength is at a minimum; and the voltage regulator subsystem thereby provides a mechanism by which the minimum can be changed selectively.

Other subsystems preferably connect with the circuit to provide other features, for example to detect whether water or ice completes the circuit. In one aspect, the power source is a DC supply (e.g., a battery) which provides voltage to the circuit and which connects to the deicing electrodes. In another aspect, a DC ammeter connects with the circuit to measure the DC conductivity of the ice (i.e., the semiconductive layer which "shorts" the two electrodes when formed over the surface and any part of the grid second electrode). In another aspect, an AC supply connects with the circuit to generate AC voltages between about 10 kHz and 100 kHz, selectively. According to another aspect, an AC ammeter also connects with the circuit to measure the AC conductivity of the ice at frequencies within the 10–100 kHz range. In still another aspect, a current comparator compares the AC and DC conductivities.

These aspects thus provide circuitry which can, for example, distinguish whether the semi-conductive layer formed over the surface is ice, which might be dangerous, or surface water. The AC conductivity (in the above-mentioned range) and DC conductivity of water are substantially the same. With respect to ice, however, the AC conductivity and DC conductivity differ by two to three orders of magnitude. This difference in conductivity is measured by the respective ammeters and is compared in the current comparator. When the difference in conductivity is greater than a predetermined set point, the current comparator signals an icing alarm. At this point, for example, the voltage regulator subsystem can operate to apply a DC bias to the circuit—and thus to the interface—at a desired field strength which sufficiently reduces the ice adhesion strength. According to one aspect of the invention, when ice is detected on an aircraft wing, the icing alarm initiates a feedback loop within the system which (a) measures ice conductivities, (b) determines appropriate bias voltages to reach minimum (or near minimum) ice adhesion conditions, and (c) applies a bias voltage to the ice-wing interface to facilitate ice removal.

Those skilled in the art should appreciate that the above-described system can be applied to many surfaces where it is desired to reduce ice adhesion strength, such as on car windshields, ship hulls and power lines. In such cases, if the surface material is weakly conductive, it is desirable to "dope" the surface material such that it is sufficiently conductive. Doping techniques are known to those in the art. Automobile tires, for example, can be doped with iodine to make the rubber conductive. Automobile glass, likewise, can be doped with either ITO or fluoride doped $SnO_2$ to make the windshield an acceptable semiconductor.

However, in another aspect, the above described system and circuit are also applicable to situations where it is desirable to increase the ice adhesion strength. In this aspect, for example, when the icing alarm detects ice, the system activates the feedback loop to regulate applied DC voltages to the interface so as to increase ice adhesion. Situations and surfaces which can benefit from this system include, for example, the bottom soles of a person's shoe (or shoes) and car tires on icy roads.

In still another aspect, the invention can include a variable ice adhesion/voltage control subsystem which increases and then decreases ice adhesion strength between ice and a surface, selectively. By way of example, cross country skis (or telemarking skis) ideally have higher friction when climbing an incline (or when descending an incline, in certain situations) and have lower friction when "skiing" down an incline. According to one aspect of the invention, the ice adhesion system and circuit described herein is attached in circuit with the skis and the operator can adjustably control ski friction selectively.

In another aspect, the invention provides methodology for reducing the adhesion strength between an automobile windshield (or any window) so that ice is easily removed. In this method, the window or windshield is doped so as to make the window a semi-conductor (i.e., so that the window is conductive to electricity). A first electrode is attached to the window; and a second grid electrode is suspended over the windshield and without contacting the windshield. By way of example, the second electrode can be applied to an electrically insulating grid between the grid electrode and the windshield. The insulator and second electrode are preferably transparent so users can see through the window. As ice forms on the windshield, a current path is created from the second electrode and the window (and hence the first electrode). Ice thus "shorts" the circuit when formed over the window and any part of the grid. A voltage is then applied across the electrodes so that the ice adhesion strength is reduced, as discussed herein. The area of the electrodes is preferably much less than the overall area of the interface between the ice and the windshield.

In still another aspect, a method is provided for increasing the coefficient of friction between an automobile tire and an icy road. An AC, high voltage power source is connected with an automobile such that a voltage potential is imparted to the interface between the road and the tire. Typically, the AC has a frequency of between about 1 kHz and 1000 kHz. The tire is manufactured with a conductive material disposed therein, such as carbon, or doped such as with iodine, so that current flows through the tire. A voltage potential is then selected and applied to increase the adhesion strength of the ice relative to the tire, increasing the tire's traction on the icy road.

Other useful background to the invention may be found with reference to the following papers, each of which is incorporated herein by reference: Petrenko, *The Effect of Static Fields on Ice Friction*, J. Appl. Phys. 76(2), 1216–1219 (1994); Petrenko, *Generation of Electric Fields by Ice and Snow Friction*, J. Appl. Phys. 77(9), 4518–4521 (1995); Khusnatdinov et al., *Electrical Properties of the Ice/Solid Interface*, J. Phys. Chem. B, 101, 6212–6214 (1997); Petrenko, *Study of the Surface of Ice, Ice/Solid and Ice/Liquid Interfaces with Scanning Force Microscopy*, J. Phys. Chem. B, 101, 6276–6281 (1997); Petrenko et al., *Surface States of Charge Carriers and Electrical Properties of the Surface Layer of Ice*, J. Phys. Chem. B, 101, 6285–6289 (1997); and Ryzhkin et al., *Physical Mechanisms Responsible for Ice Adhesion*, J. Phys. Chem. B, 101, 6267–6270 (1997).

The invention is next described further in connection with preferred embodiments, and it will become apparent that various additions, subtractions, and modifications can be made by those skilled in the art without departing from the scope of the invention.

BRIEF DESCRIPTION OF THE DRAWINGS

A more complete understanding of the invention may be obtained by reference to the drawings, in which:

FIGS. 1A–1D graphically show spatial distributions of electrical charge densities ρ(x) near ice-air and ice-metal interfaces;

DETAILED DESCRIPTION OF THE DRAWINGS

Figure 2A:
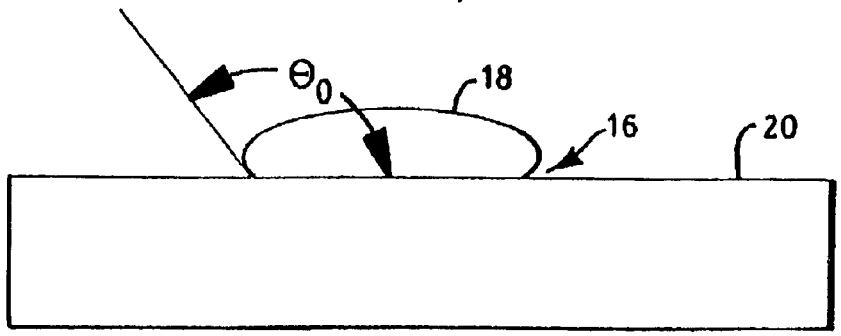
FIGS. 2A–2C illustrate effects of DC bias on ice adhesion to a liquid metal (Mercury), smaller contact angles Θ indicating stronger adhesion.

The invention includes systems and methods which modify ice adhesion strength to materials such as metals and semiconductors by application of a DC bias to the interface between the ice and the materials. The invention can thus be used to reduce and in some cases eliminate the adhesion of ice onto such materials.

In certain embodiments, the invention modifies the electrostatic interactions which form the bonding between ice and metals. These interactions are effectively changed (either reduced or enhanced) by application of a small DC (direct current) bias between the ice and the metals.

Experimentation and theoretical calculations have shown that ice surfaces have high density electrical charges of $10^{-2}$ C/m$^2$ to $3 \cdot 10^{-2}$ C/m$^2$. See, Petrenko et al., *Generation of Electric Fields in Ice and Snow Friction, J. Appl. Phys.*, 77(9):4518–21 (1995); Petrenko, *A Study of the Surface of Ice, Ice/Solid and Ice/Liquid Interfaces with Scanning Force Microscopy, J. Phys. Chem.* B, 101,6276 (1997); and Dosch et al., Surface Science 366, 43 (1996), each of which is hereby incorporated by reference. This charge density originates from the strong polarization of water molecules in the ice subsurface layer. These phenomena are further illustrated in FIG. 1.

FIGS. 1A–1D illustrate a relationship between molecular polarization P and space charge density ρ as a function of distance from an ice-air interface (FIGS. 1A–1C) or an ice-metal interface (FIG. 1D). In FIG. 1D, an electrical charge induced in a metal is equal in magnitude and opposite in sign to the charge in ice. The horizontal axes 10 of FIG. 1 refers to distance x relative to "L" as the screening length. FIG. 1A also illustrates water molecule polarization P (along the vertical axis 12a) near the surface; while FIG. 1B shows charge density ρ (along the vertical axis 12b) of the polarization charge ρ(x)=−dP/dx without screening. FIG. 1C illustrates charge density ρ (along the vertical axis 12c) of the polarization P but with additional screening by minority charge carriers. FIG. 1D graphs charge density ρ (relative to the vertical axis 12d) within ice near the ice-metal interface (data 14a) and within metal or dielectric material (data 14b) near the same interface.

The interaction between ice surface charges and the charge induced in a solid affects the strength of an ice-solid interface. By estimation, the electrostatic attraction (negative pressure $P_{el}$) of two plane surface charges is given by:

$$P_{el} = \frac{\varepsilon_0 \varepsilon E^2}{2} \quad (1)$$

where $\varepsilon_0$ is the dielectric permittivity of the vacuum, and E is the electric field strength in the space between the charges. Since the charge distribution shown in FIG. 1D determines the contact potential $V_c$ of the two materials, we can estimate E as $V_c/L$, where L is the distance between the plane charges located in the ice and in the solid. $V_c$ for ice-metal interfaces varies from a few tenths of a volt to about 1V. See, Buser et al., *Charge Separation by Collision of Ice Particles on Metals: Electronic Surface States, Journal of Glaciology*, 21(85): 547–57 (1978), which is incorporated herein by reference.

Taking L≈1 nm (the main screening length in the doped ice illustrations above), $\varepsilon$=3.2 (the high-frequency dielectric constant of ice) and $V_c$=0.5 V (the typical magnitude of a contact potential), equation (1) provides that $P_{el}$≈3.3 Mpa, a magnitude comparable with, but exceeding, the macroscopic tensile strength of ice at 1.5 MPa. See, Schulson et al., *A Brittle to Ductile Transition in Ice Under Tension, Phil. Mag.*, 49, 353–63 (1984), which is hereby incorporated by reference.

More sophisticated calculations of the electrostatic interaction energy between ice surface charges and metals are shown below, utilizing real space-charge distributions and charge relaxation calculations. Specifically, it is shown below that this interaction energy is 0.01 to 0.5 J/m$^2$ at −10° C. The lower limit 0.01 J/m$^2$ corresponds to pure ice; while the upper value 0.5 J/m$^2$ corresponds to heavy doping. These values are comparable with other experimental results, described below, which utilized scanning force microscopy ("SFM"). The SFM results determined an electrostatic interaction energy of 0.08±0.012 J/m$^2$; and experiments on ice/mercury interfaces return 0.150+/−0.015 J/m for that electrostatic part of ice/metal adhesion.

Since electrostatic interactions contribute to ice adhesions, the adhesion strength between ice and a conductive material (e.g., a metal or semiconductor) is changed by an external DC bias applied across the ice-material interface.

To determine the effect of DC bias on ice adhesion, the interface was modeled as a liquid-solid interface instead of a solid-solid interface. Indeed, the interfacial energy which determines the adhesion is reliably measured in a contact-angle experiment when one material is a liquid and the other a solid, as in the water-metal situation. A similar technique is thus employed for an ice-metal interface if the metal is in the liquid phase. Mercury, for example, with its melting point at −38.83° C., low chemical activity, and ease in preparing a clean surface, is well suited to prove the model; and the effects of small DC biases on the adhesion of ice to Mercury is illustrated in FIGS. 2A–2C.

Figure 2B:
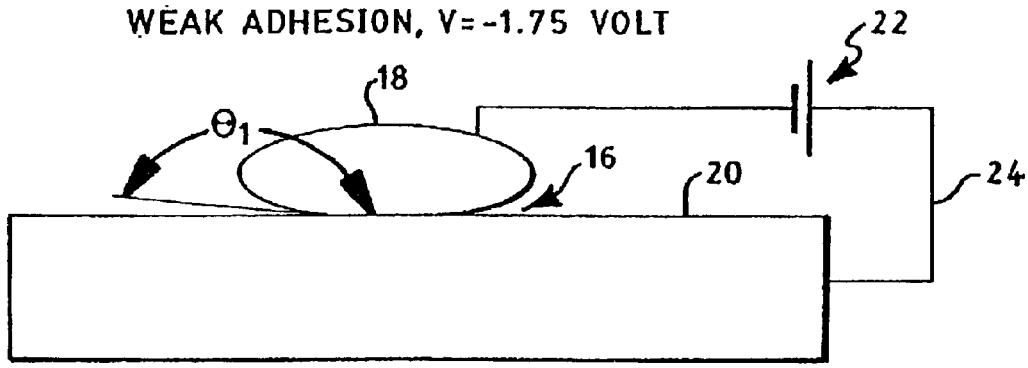
Figure 2C:
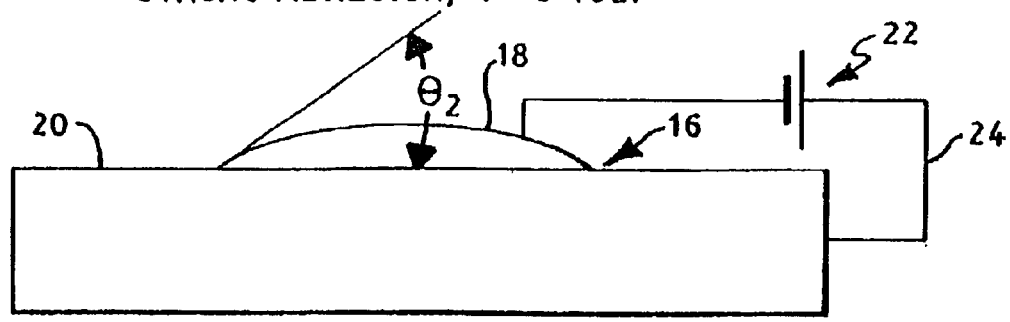

FIG. 2A shows an initial adhesion of Mercury 18 to ice 20, the adhesion strength being represented by $\Theta_0$. Accordingly, $\Theta_0$ represents adhesion strength without applied voltage (i.e., V=0). FIG. 2B, on the other hand, illustrates the resultant adhesion strength $\Theta_1$ which occurs with the application of −1.75V supplied by a DC voltage source 22. The source 22 can be, for example, a battery or other voltage source known in the art. Wiring 24 connects the source 22 to the Mercury 18 and to the ice 20 to complete the circuit. FIG. 2C illustrates another adhesion strength $\Theta_2$ which results from an applied voltage of −5V provided by the source 22. It is noteworthy that $\Theta_2 < \Theta_0 < \Theta_1$ even though the applied voltage varies from 0V (FIG. 2A) to −1.75V (FIG. 2B) to −5V (FIG. 2C), indicating a significant change of adhesion strength through a small range of negative voltage differentials. Adhesion strength $\Theta_1$ shows a relatively "weak" adhesion as compared to $\Theta_2$ or even $\Theta_0$. Adhesion strength $\Theta_2$, on the other hand, is relatively "strong" as compared to $\Theta_1$ and $\Theta_0$.

To measure the surface tension of the ice-mercury interface 16 of FIG. 2, an ice manometer 26 (schematically shown in FIG. 3) was used. The DC power supply 22' was used for the source 22 of FIG. 2. A DC ammeter 28 was placed in the manometer circuit 26 to measure current flow. The source 22' connects in circuit to the Mercury 18' and to a mesh electrode 30 connected with the ice 20'. Accordingly, the circuit 26 is completed by the current flow through the Mercury 18' and the ice 20'. The Mercury 18' is in fluid communication with the ice 20' through a small capillary 32 of selected diameter. As the DC bias changes, the ice adhesion between the Mercury 18' and the ice 20' changes and forces due to gravity adjusts the height "h" of the Mercury 18' within the ice 20' (i.e., within the capillary 32 extending upwards into the ice 20').

Figure 3:
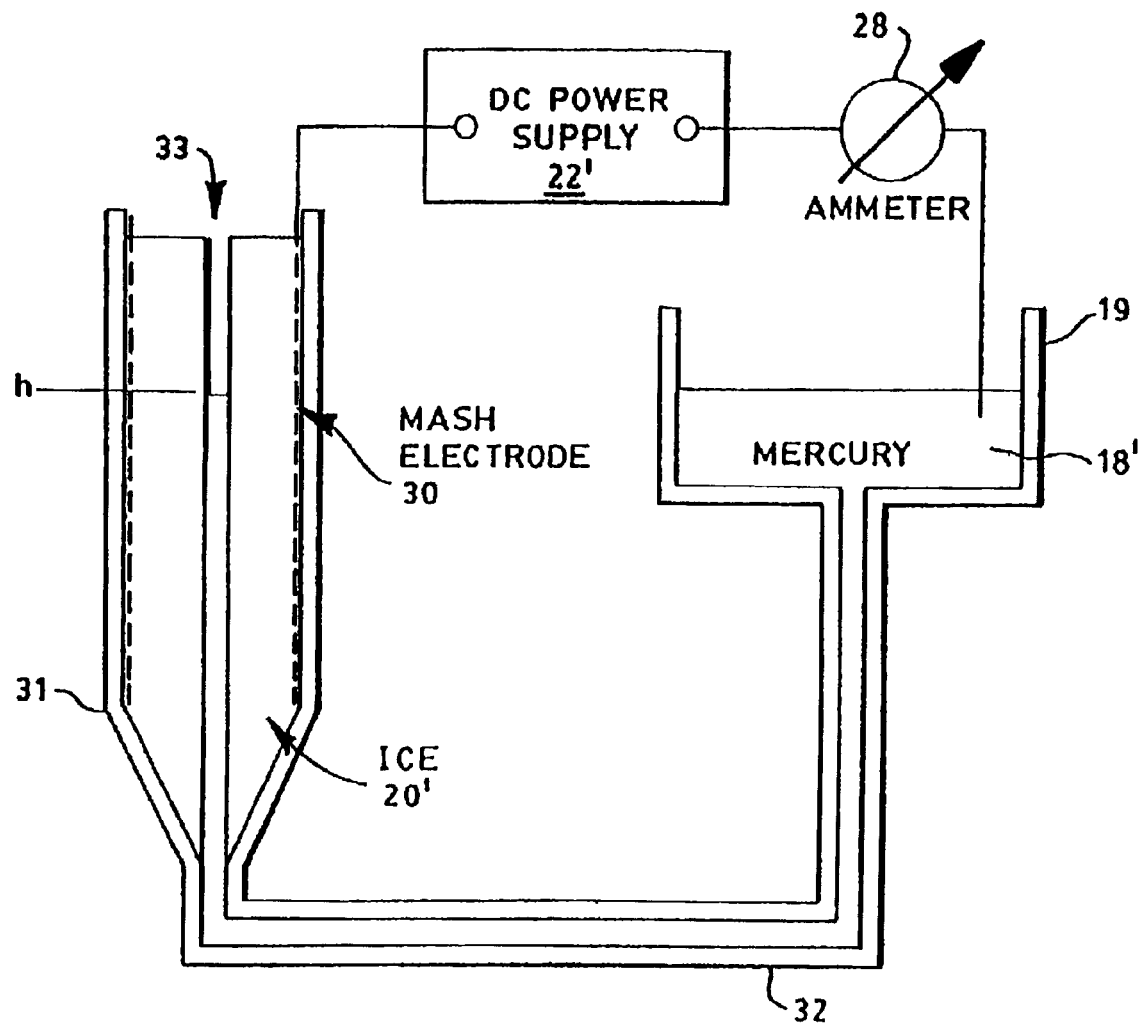
FIG. 3 schematically illustrates an ice manometer used in measurements of ice-mercury interfacial energy such as illustrated in FIG. 2.

Specifically, the equilibrium position h of the Mercury 18' in the capillary 32 is:

$$h \approx 2 \cdot (W_{i/a} - W_{i/Hg})/gr\rho \quad (2)$$

where g is gravity acceleration, r is the capillary radius, $\rho$ is the density of mercury, $W_{i/a}$ is the surface energy of the ice-air interface, and $W_{i/Hg}$ is the surface energy of the ice-Hg interface. When h is measured, equation (2) is used to calculate $W_{i/Hg}$, and, thereby, the adhesion strength of ice to the liquid metal (Mercury). In FIG. 3, the capillary's radius r was 0.25 or 0.5 mm during testing.

Figure 4:
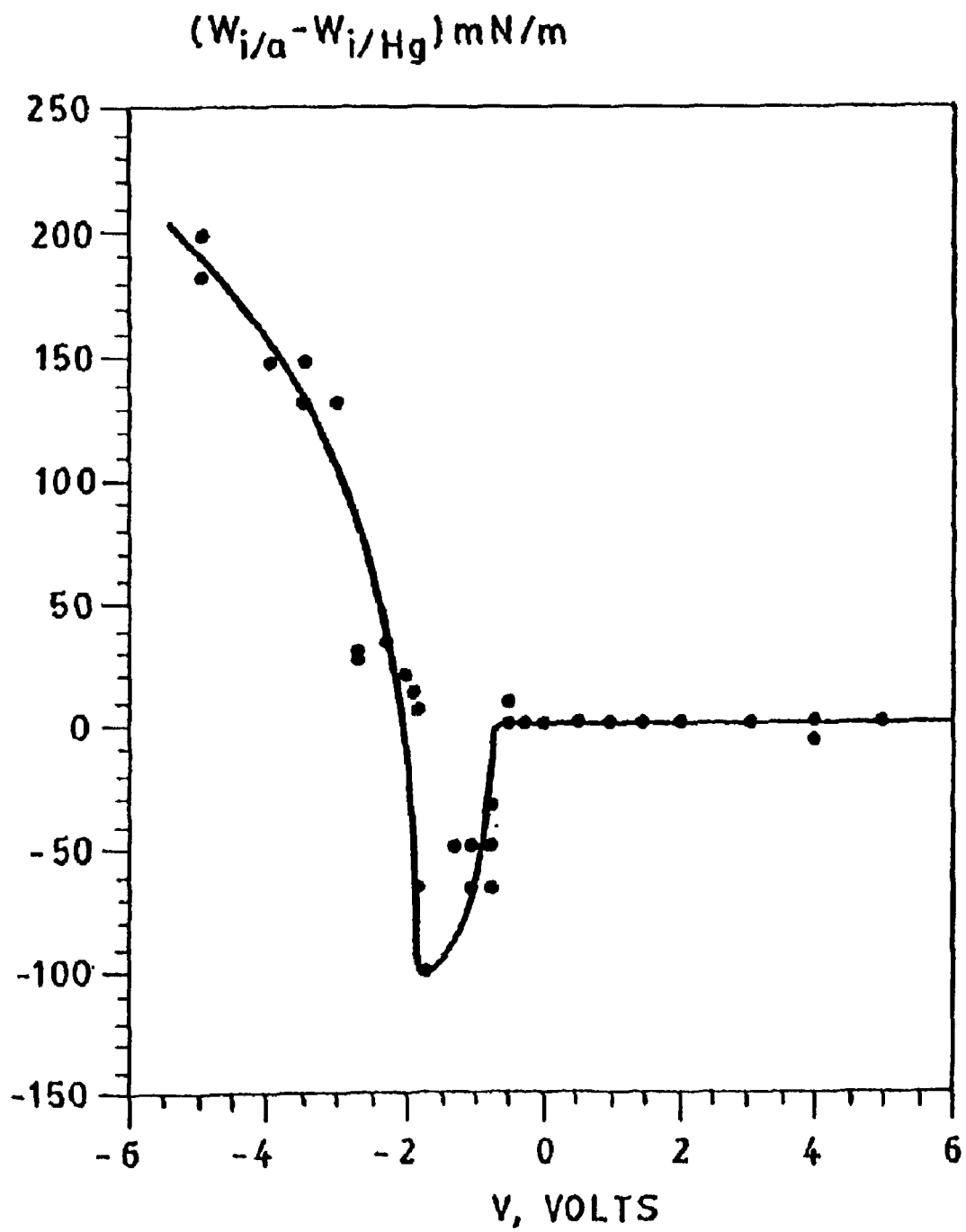
FIG. 4 graphically illustrates experimental results of DC bias versus ice-Hg interfacial energy for ice doped with 0.5% NaCl, T=−10° C.

Additional experimentation such as within the configurations of FIGS. 2 and 3 include 99.9998% pure electronic grade Mercury and polycrystalline ices grown from: very pure deionized water; distilled water; untreated tap water; and deionized water doped with small concentrations of NaCl or KOH or HF. The experiments were performed inside a cold room in the temperature range −20° C. to −5° C., ±2° C. (most testing was conducted at −10° C. and with a relative humidity of 89–91%). For doped ices, it was noted that DC bias had a strong effect on the ice-Mercury interfacial energy. The magnitude and sign of the energy change $\Delta(W_{i/a}-W_{i/Hg})$ depends upon the bias polarity and magnitude and on the type and concentration of the dopant. FIG. 4, for example, shows $\Delta(W_{i/a}-W_{i/Hg})$ versus bias V measured at T=−10° C. for ice doped with 0.5% NaCl. As illustrated, the bias can reduce or enhance adhesion of ice to Mercury: at approximately −1.75V, a minimum adhesion strength was reached; while the adhesion strength increased from −2V to −6V. The effect of interfacial energy is more pronounced for NaCl concentrations above 0.05%.

With lower concentrations of NaCl, or with ice grown from tap water, the adhesion strength varied little and was weakly reproducible when a low DC bias was applied. With ice doped with 0.5% NaCl, on the other hand, the mercury moved immediately after the voltage bias is applied; and the effect was completely reversible, i.e., $W_{i/Hg}$, was restored, after the bias was shut off. These results are reproducible and easy to observe. The maximum change in h was 12 mm for a capillary radius r=0.25 mm.

Measurements of current-voltage characteristics also show that it is the voltage, not the current, that causes the changes in adhesion strength discussed above. Typical experimentation, for example, produced current strengths in tens of $\mu A$; and the estimated rate of the temperature change was less than $10^{-6}$° C./s. In ice doped with KOH or HF, the application of a DC bias caused a near-symmetrical decrease in $W_{i/Hg}$, which was comparable in magnitude with that found on NaCl-doped ice. Application of an AC voltage up to 40V in amplitude and in the frequency range 10 Hz to 10 kHz did not produce any noticeable changes in $W_{i/Hg}$. In pure deionized or distilled water, the application of a DC bias up to 40V also did not produce noticeable changes in $W_{i/Hg}$. It thus takes 1 kV to 3 kV to change the adhesion of very pure ice to a metal. Different reactions of pure and doped ice to a DC bias are attributed to their differences in screening length and electric relaxation time.

The above experimentation confirms the important role played by electrical double layers on ice-metal interfaces in ice adhesion. Although the absolute magnitude of $W_{i/Hg}$ can slightly differ in the case of solid Mercury, the electrostatic interactions are essentially the same in both cases (for liquid Hg and solid Hg). It was also shown by experimentation that ice adhesion to a metal is efficiently modified by application of a small potential difference between the ice and metal. Variations of adhesion strength also occur for a DC bias applied to ice containing different impurities, to different solid metals, and at different temperatures.

The inventor has also studied an electrostatic model of ice adhesion based on the existence of the surface states of protonic charge carriers on the surface of ice. At distances greater than one intermolecular distance the model gives an order of magnitude for the adhesive energy which is significantly greater than both chemical bonding energy and van der Waals forces. It also provides an understanding of the time- and temperature-dependent phenomena that explain the difference between adhesive properties of ice and water, the physical mechanisms of bonding between ice and other solids, and the nature and strength of molecular bonding between ice and various solids.

It is reasonable to classify bonding mechanisms into one of three groups: a covalent or chemical bonding mechanism, a dispersion of or fluctuation in electromagnetic interaction (van der Waals forces), or a direct electrostatic interaction. See, e.g., Israelachvili, *Intermolecular and Surface Forces*, 2nd ed., Academic Press: London, Ch. 2 (1991), which is herein incorporated by reference. The first mechanism corresponds to chemical reactions and the formation of interfacial compounds. In covalent or chemical bonding, the adhesive energy results from lowering of the quantum-mechanical energy of the system due to overlap of the wave functions of the interacting solids. Such an interaction is essential only at a distance on the order of 0.1–0.2 nm. In addition, this type of adhesion is very sensitive to the chemical nature of adhesive solids. In a perfect contact, the chemical bonding mechanism can provide adhesive energy of $\leq 0.5$ J/m², a value considered the lowest value of adhesion energy for the chemical bonding mechanism.

In contrast to chemical bonding, van der Waals forces are long-range and act between all substances. These forces are defined only by the macroscopic characteristics of a solid (dielectric function at different frequencies), and for this reason they are rather insensitive to experimental conditions. See, e.g., Mahanty et al., *Dispersion Forces*, Academic Press, London, Chapter 9 (1976); Barash et al., *The Dielectric Function of Condensed Systems*, Eds. Keldysh, et al., Elsiever Science, Amsterdam, Chapter 9 (1989), each of which is incorporated by reference.

In addition to chemical bonding and dispersion forces, two solids that contain noncompensated or spatially separated charges also generate electrostatic forces. Its importance and importance to adhesion have recently been rediscovered. See, Stoneham et al., *J. Phys. C: Solid State Physics*, 18, L543 (1985); and Hays, *Fundamentals of Adhesion*, Ed. Lee, Lee, Plenum Press, New York, Chapter 8 (1991), each of which is incorporated by reference.

Model of Adhesion Properties of Ice

A model is next developed to describe the electrical properties of the surface of ice. The model reveals a connection between ice adhesion and other properties of ice. The model is compared with van der Waals forces, the chemical bonding mechanism, and with experimental results.

The main conclusion of the model discussed below is that electrostatic interaction plays a significant, if not the major, role in ice adhesion. One important parameter in the model is that of the ordering of water molecules adjacent to the ice-solid interface or, in other words, that of the appearance of the surface states for protonic charge carriers. This reduces the problem to one of simulating water molecule behavior at the solid surface. However, the below description will assume that there exist surface states that can be occupied by protonic point defects. The occupancy of these surface states is defined by the interplay between the coulomb energy of captured charge carriers and the energy depth of the surface states. Then, either the occupancy coefficient of a surface state (in the nonequilibrium case) or the energy depth of the surface state will be taken as a parameter.

Ice includes polar water molecules that strongly interact with any solid substrate which has dielectric permittivity different from that of ice. In addition, there is theoretical and experimental evidence for the existence of a surface charge in ice. This surface charge can also interact with the substrate. Here we assume that the surface charge originates from the capture of protonic charge carriers by the ice surface. The captured defects are presumably D defects, $H_3O^+$ ions, or protons. Positive ions are smaller in size than negative ones, because they have fewer electrons or do not have them at all, and exist as protons. Thus we can use the image charge theory for smaller distances, where the potential energy of the charge and its image may be less than the charge energy within the ice. For negative ions of larger size it is more difficult to reach this. At thermal equilibrium the occupancy of surface states is not perfect because the gain in energy due to captured charge carriers is compensated for by the rise in electrostatic energy. However, the electrostatic energy itself can be reduced significantly by charge redistribution inside the substrate (by induced charges). This could lead to perfect occupancy of the surface states and rather high adhesion energy (close to the electrostatic energy).

The spatial distribution of charge carriers in the subsurface layer of ice is described below. The first integral of Poisson's equation can be written in the following form:

$$E = \frac{\sigma_0}{\varepsilon\varepsilon_0} f(V) \quad (3)$$

where E and V are the electric field strength and electrostatic potential, respectively (both are functions of the space coordinate z); $\sigma_0 = e_B \cdot \lambda \cdot N$; $e_B$ is the effective charge of Bjerrum defects; N is the concentration of water molecules; $\lambda$ is the screening length given by $\sqrt{\varepsilon\varepsilon_0 kT/e_B^2 N}$; and $\varepsilon_0$ are, respectively, the dielectric permittivities of ice ($\approx 3.2$) and of a vacuum' and k and T are the Boltzmann's constant and temperature, respectively. The function f(V) is defined by the following equations:

$$f(V) = \sqrt{\ln(a(V) \cdot a(-V) \cdot b^{2(V)} \cdot b^{2(-V)})} \quad (4)$$

$$a(V) = \frac{\exp(E_i/2kT) + (4/3)\exp(e_i V/kT)}{\exp(E_i/2kT) + 4/3} \quad (5)$$

$$b(V) = \frac{\exp(E_B/2kT) + \exp(e_B V/kT)}{\exp(E_B/2kT) + 1} \quad (6)$$

Here we use Bjerrum defects as charge carriers being captured in the surface states. Equation (3) holds at any point of the ice crystal. Applying it to the ice surface, we get the relationship between the surface charge density $\sigma_s$ and the surface potential $V_s$: $\sigma_s = \sigma_0 f(V_s)$.

Using equations (3) through (6), we can now calculate the electrostatic contribution to the adhesion energy of ice. First, the electrostatic energy of the screening layer of ice as a function of the surface potential is calculated, since it gives the upper limit for the adhesion energy. Using the definition of electrostatic energy and equation (3) we get:

$$W(V_s) = \qquad (7)$$
$$\int_0^\infty \frac{\varepsilon\varepsilon_0}{2} E^2 dx = -\frac{\sigma_0}{2} \cdot \int_0^\infty f(V) \cdot \frac{dV}{dx} dx = \frac{\sigma_0}{2} \cdot \int_0^V f(V) dV$$

Figure 5:
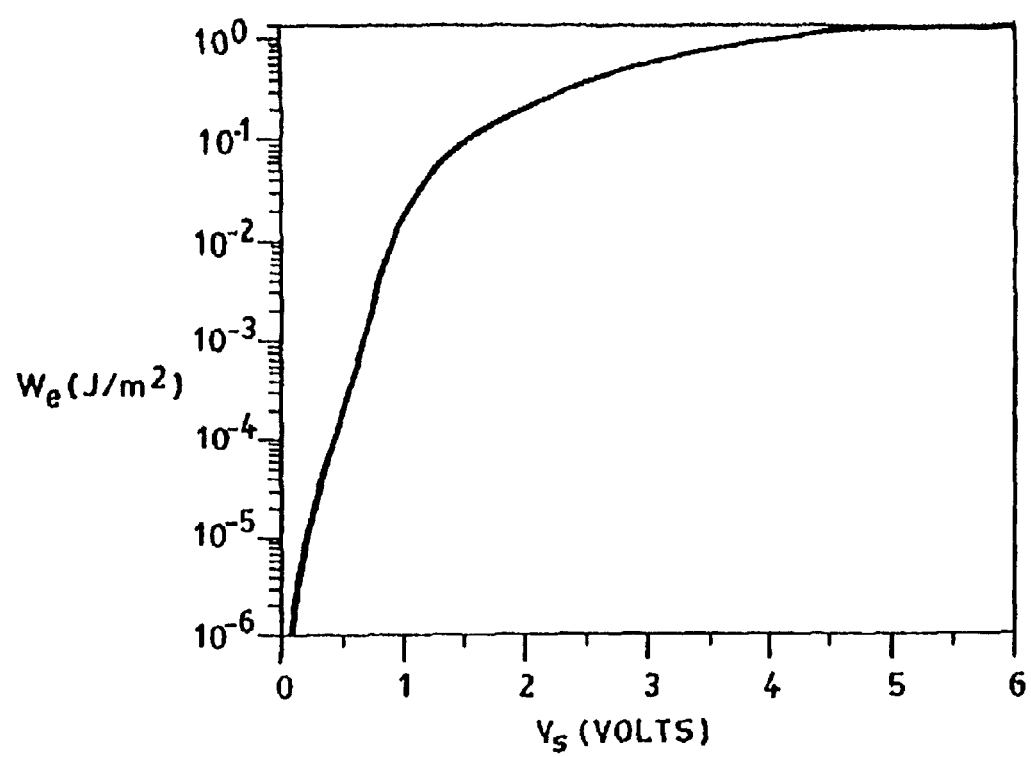
FIG. 5 shows a graph illustrating electrostatic energy of a screening layer of ice per surface unit, $W_e$, vs. surface potential, $V_S$ (T=−10° C.)

The graph of $W_e$ vs. $V_s$ is pictured in FIG. 5. Perfect occupancy by Bjerrum D defects, positive ionic defects $H_3O^+$, or protons gives the values of the surface potential $V_s \approx 1.47$ V, 2.50 V, and 5.13 V, respectively. According to FIG. 5, complete occupancy of the surface states by $H_3O^+$ ions, Bjerrum defects, and protons correspond to an upper limit of adhesion energy of 0.8 J/m$^2$, 0.32 J/m$^2$, and 1.35 J/m$^2$, respectively. The smaller values are for imperfect occupancy. Using the relationship between the surface charge density and surface potential, energy vs. surface charge density is calculated.

Now let us consider a metallic plate at a distance d from an ice surface. The non-uniform charge distribution in the ice will induce a surface charge on the metal and, therefore, an electric field between the ice and the metal plate. The total electrostatic energy of the system per unit area can be written in the following form:

$$W_e(d, V) = \frac{\sigma_0^2 \cdot d}{2\varepsilon\varepsilon_0} \cdot \left[f(V) - \frac{\sigma}{\sigma_0}\right]^2 + \frac{\sigma_0}{2} \cdot \int_0^V f(V') dV' \quad (8)$$

However, V in equation (8) is the surface potential of ice, which has to be found from minimization of the energy for each value of distance d. Surface charge density can be considered a constant, which arguably corresponds to a non-equilibrium occupancy of the surface states. Performing a minimization procedure for $W_e(d,V)$, we arrive at the adhesion energy per unit area as a function of d:

$$W_a(d) = W_{min}(d) - W_{min}(\infty) \quad (9)$$

Figure 6:
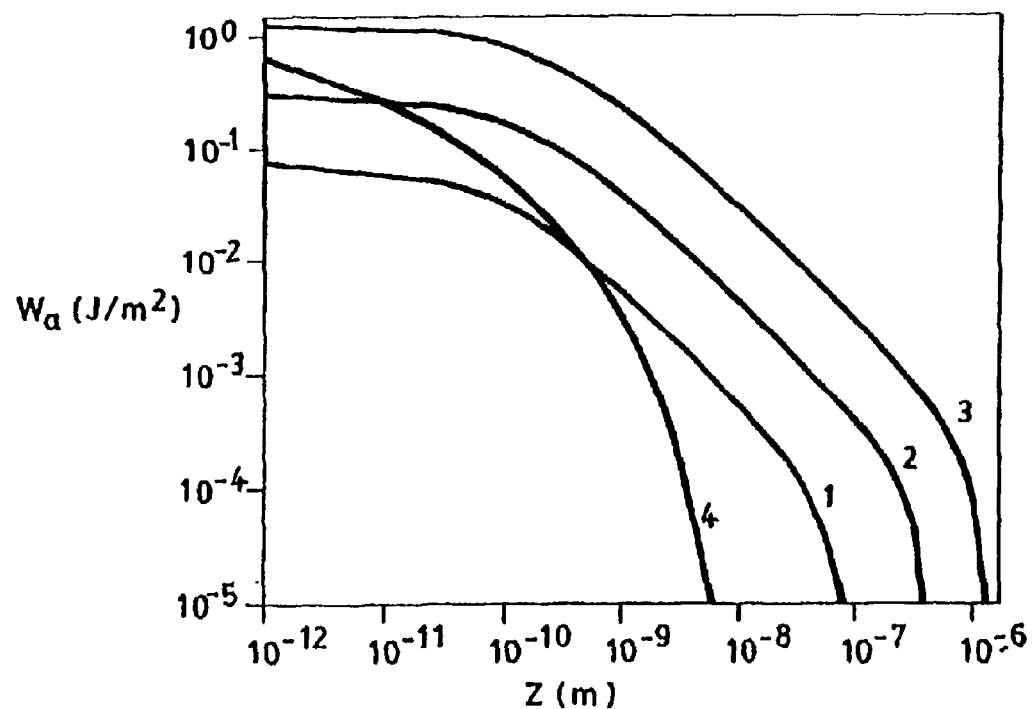
FIG. 6 shows a graph illustrating adhesive energy of an ice-metal interface per surface unit, $W_a$, as a function of distance, z, curves 1, 2, and 3 corresponding to perfect occupancy by D defects, $H_3O^+$ ions, and protons, respectively (fixed occupancy curves) and curve 4 depicting equilibrium dependence of adhesion energy on distance for proton surface states (T=−10° C.)

This function is pictured in FIG. 6 for the same cases of perfect occupancy by the Bjerrum D defects, positive ionic defects $H_3O^+$, and protons, shown as data curves 1, 2, and 3 respectively.

Under equilibrium conditions, the surface charge density of ice increases with a decrease in the distance d because of screening of the ice surface charge by an induced charge on the metal plate. Indeed, in this case the coulomb energy of captured charge carriers decreases, so higher occupancy becomes possible. In considering this case one first has to sum up the electrostatic energy, the energy gain due to occupancy of the surface states, and the entropy contribution of the surface defects:

$$F = \frac{d\sigma_0^2}{2\varepsilon\varepsilon_0} \cdot \left(\left[f(V) - \frac{\sigma}{\sigma_0}\right]\right)^2 + \frac{\sigma_0}{2} \cdot \int_0^V f(V')dV' - \frac{\sigma}{e} \cdot E_0 + \frac{kT}{e} \cdot \left[\sigma \cdot \ln\left(\frac{\sigma}{\sigma_m}\right) + (\sigma_m - \sigma) \cdot \ln\left(1 - \frac{\sigma}{\sigma_m}\right)\right] \quad (10)$$

Here $E_0$ is the energy of surface states (assuming $E_0 = -0.5$ eV), $\sigma_m = e/S$, and S is the surface area of one water molecule. The free energy F is then minimized over V and $\sigma$. This procedure also assumes that the chemical potential of the ice bulk is kept constant and equals zero. Doing so for every value of d, we arrive at the equilibrium free energy as a function of the distance or equilibrium adhesion energy. This is also pictured in FIG. 6 (curve 4, for protons).

Figure 7:
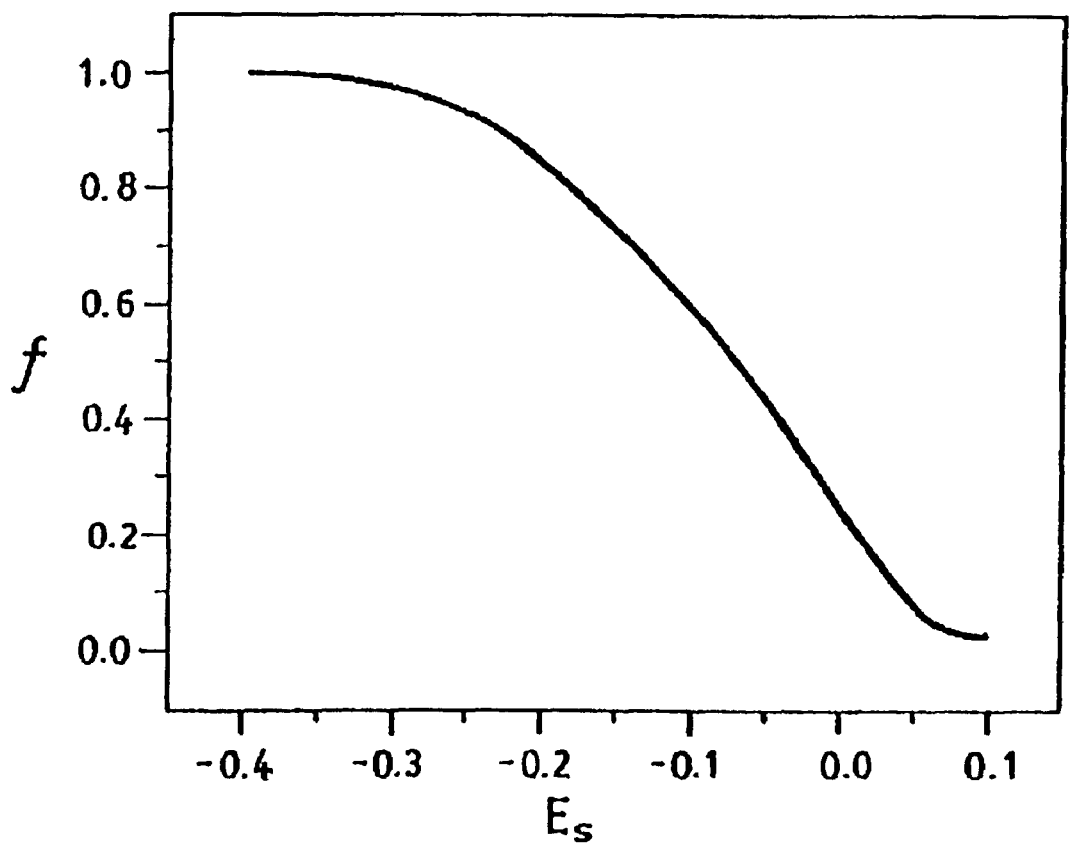
FIG. 7 shows a graph illustrating the occupancy coefficient of surface states for D defects, f, as a function of surface states energy, $E_s$ (T=−10° C.)

A similar procedure enables us to find the equilibrium occupancy of the surface state or the surface potential of ice as a function of the energy of surface states $E_0$ or temperature. Let us assume that the metallic plate is infinitely far from the ice surface. Then, to minimize the first positive element in equation (8), it is assumed that $\sigma = \sigma_0 f(V)$. F then becomes a function of only one parameter, either V or $\sigma$. It is somewhat easier to perform the final minimization over V, but the results can also be recalculated as a function of $\sigma$. The occupancy coefficient of the surface states with D defects plotted versus surface state energy is shown in FIG. 7. The surface state energy level is measured with respect to the chemical potential of D defects in the bulk.

As can be seen from the results of FIGS. 5–7, typical values of the adhesion energy are located between 1.3 J/m² and 0.08 J/m², depending on the type of charge carriers and the energy of their surface states. This magnitude is comparable to, or even higher than, the experimentally measured adhesion energy of ice-metal interfaces at −20° C. In fact, the adhesion energy is as high as the chemical bonding mechanism; however, in contrast to the latter, the electrostatic mechanism remains significant up to a larger distance (about $10 \cdot r_{oo}$; $r_{oo} = 0.276$ nm). Thus, at distances larger than $r_{oo}$, the electrostatic mechanism is significantly more important than the chemical bonding mechanism. Accordingly, at distances greater than $r_{oo}$, the electrostatic energy exceeds that of the van der Waals forces if the Hamaker constant equals $3 \cdot 10^{-20}$ J. Note that the last estimation concerns an ice-ice (or water-water) interface, but not an ice-metal interface, as do curves 1, 2, 3, and 4 in FIG. 6. The van der Waals interaction between ice and metal, which is also long-ranged, can also be considered.

The adhesive energy thus equals 0.01 J/m² even at $z \approx 90 \cdot r_{oo}$ for the maximum density of a surface charge, indicating long range character. The adhesive energy for a non-equilibrium detaching experiment should be higher than that for an attaching one. The latter can be explained by efficient screening of electrostatic energy by a metallic plate when ice and metal are in contact. The behavior of adhesion energy with distance in equilibrium experiments is thus readily understood. At small distances a metallic plate screens the electrostatic energy and there is high adhesive energy because the occupancy of surface states is high. However, when the distance increases, the electrostatic energy also increases, leading to lower occupancy coefficients and a lower surface charge density. By way of example, compare curves 3, 2, and 1 of FIG. 6. These curves are equivalent to the more rapid decay of free energy with distance than in the case of constant occupancy.

The behavior of the occupancy coefficient (for the model of the surface states for D defects) as a function of the surface state energy, $E_s$, is also considered The occupancy coefficient is close to zero when $E_s \approx 0.1$ eV, FIG. 7. One reason that the charge carriers are captured into the surface states with positive energy has to do with the entropy gain in the free energy. For the same reason, defects exist in the ice bulk. Note that for the bulk D defects, the "creation energy" equals 0.34 eV per defect, and this energy is significantly greater than 0.1 eV. Eventually this leads to an "occupancy coefficient" for the bulk states on the order of $3 \cdot 10^{-7}$.

Time-dependent phenomena can also be associated with ice adhesion, and are inherent in the above-described model. In order to enter or leave the surface state, defects have to overcome some electrostatic barrier, and this leads to non-equilibrium situations and time-dependent phenomena.

One important element of this model is the electrostatic attraction between the ice surface charges and the charges induced in metals, a mechanism also applicable to an ice-insulator interface except for the difference in magnitude of the induced charges. A charge q on the ice surface induces the "image charge"-q in a metal; while the same charge q will induce a smaller "image" charge q' in the insulator according to the following relationship:

$$q' = -q \cdot \frac{\varepsilon - 1}{\varepsilon + 1} \quad (11)$$

where $\varepsilon$ is a dielectric permittivity of the insulator. In most solid dielectrics, $\varepsilon$ is much larger than one and the induced charges are comparable with charges induced in metals. A smaller $\varepsilon$ results in smaller electrostatic related adhesion. By way of example, Teflon, has a permittivity $\varepsilon = 2.04$; and is well known for its low adhesion to ice.

It is useful to consider why ice is more adhesive than water. Due to higher concentrations of charge carriers in water, the screening of the surface charge in water (if it is present) is more effective than in ice (the corresponding initial electrostatic energy is much less than in ice). Thus the screening of the electric field due to the substrate cannot lower the energy significantly. Note that at temperatures close to the melting point of ice, a thin liquid layer may appear on an ice-solid interface. See Dash et al., *Rep. Prog. Phys.* 58, 115 (1995), which is hereby incorporated by reference. The model can thus be updated to include the effect of surface premelting on ice adhesion.

The above-described electrostatic model of ice adhesion shows a relationship between the electrical properties of the surface of ice and ice adhesion. The model gives a correct order of magnitude for the adhesive energy. The electrostatic interaction between ice and metals supplies energy which is significantly higher than chemical bonding energy and the van der Waals forces at distances greater than intermolecular ones. The model also provides an intuitive way to understand the time- and temperature-dependent phenomena that help explain the difference in adhesive properties of ice and water.

Effect of DC Bias on Ice Adhesion to Stainless Steel

Figure 8:
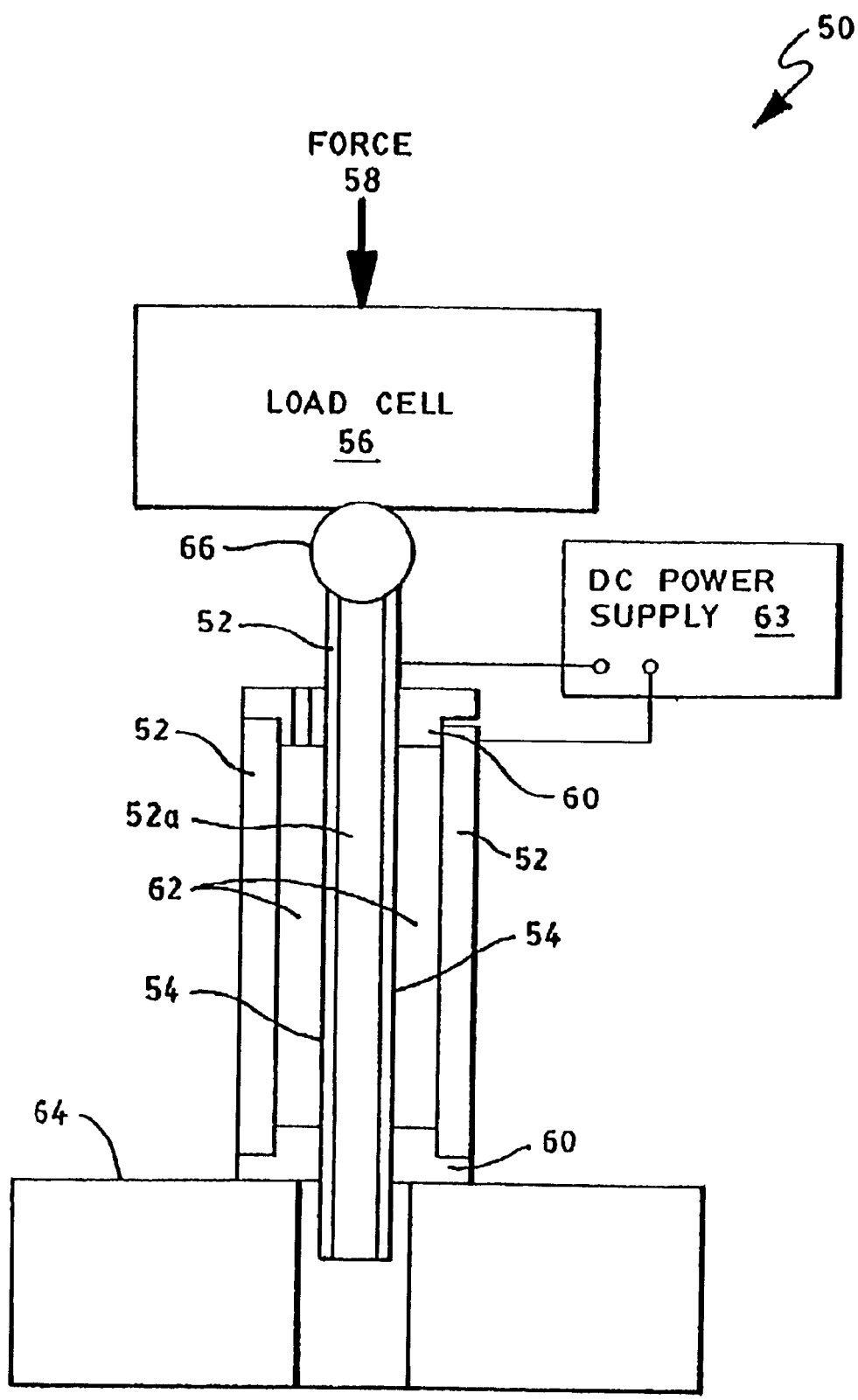
FIG. 8 schematically shows an evaluation system constructed according to the invention and used to measure effects of DC bias on ice adhesion to stainless steel.

We now consider the effect of DC bias on ice adhesion to solid metals. For experimentation purposes, we used the system 50 shown in FIG. 8. The space between the steel tubes 52 was filled with 0.5% solution of NaCl in water and the system 50 was then placed into a cold room with temperature −10° C. Multiple systems 50 were also filled with saline water. The water salinity was close to salinity of ordinary ocean water. All the samples were kept for three hours inside the cold room before testing, a time sufficient for water to freeze and for formed ice to relax from internal stress. Maximum shear strength of the ice-steel interface 54 was measured when the samples were loaded (via the load cell 56, with applied force 58) with a constant strain rate of 100 µm/min. DC bias in the range from −21 V to +21 V was applied and maintained between the stainless steel tubes 52 at the beginning of loading. Teflon caps 60 permitted movement of the inner tube 52a relative to the ice. A DC power supply 63 provided the DC bias during experimentation. The system 50 was supported by a platform 64. An insulating ball 66 thermally and electrically decoupled the load cell 56 from the rest of the system 50.

During mechanical tests, the electric current, load and temperature were recorded on a computer hard drive. A data acquisition board DAS-1800 and Lab View software were used for data recording.

Since ice adhesion is very sensitive to salt concentration, the concentration was measured in melt of the samples after the tests. Before and after, the surfaces of the stainless steel tubes 52 were washed with a mild abrasive-containing washer, rinsed first in distilled water, methanol, and again in distilled water. The cleaning procedures and the control of salt concentration are important for data reproducibility.

To determine if an application of DC power (from the supply 63) causes a change in ice temperature, a thermocouple (not shown) was placed in the ice 62 between the steel tubes 52 in several tests. Within the precision of these tests (±0.05° C.), no change in temperature was noted.

Figure 9:
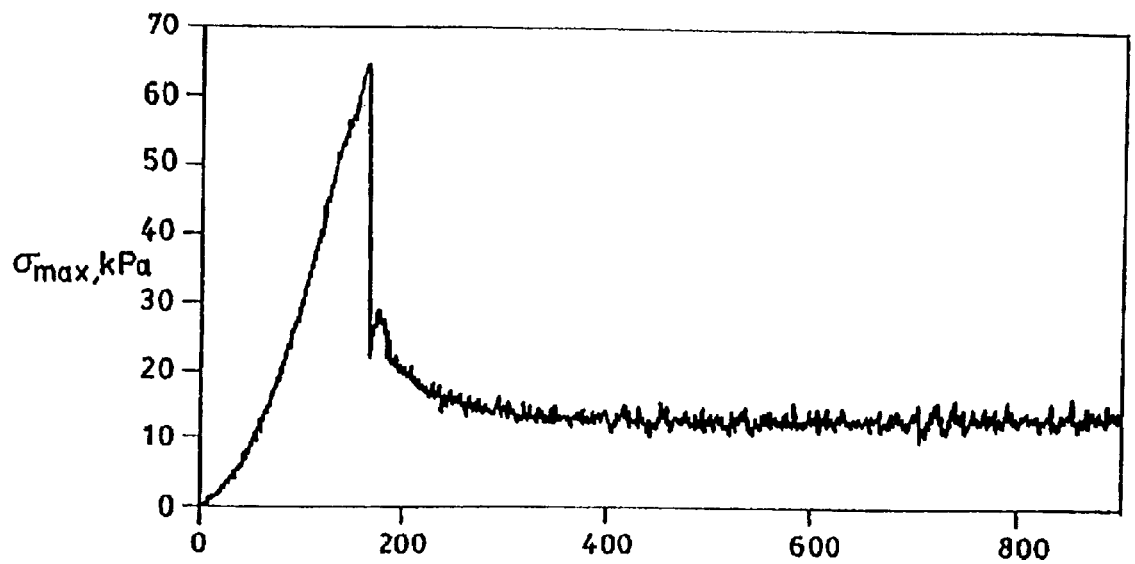
FIG. 9 graphically illustrates shear stress vs. time for an ice-stainless steel interface measured with the system of FIG. 8 with no voltage applied to the mobile steel electrode, the ice samples grown from 0.5% solution of NaCl in distilled water and tested at −10° C. under constant strain rate of 100 μm/min.

FIG. 9 shows results of a typical load versus time diagram when an ice-steel interface is tested under zero DC bias. As one can see, the load reaches its maximum value and then drops down when the interface is broken. The residual resistance of the sample to the constant strain rate is due to viscous sliding of the steel on the salted ice. Still, application of a DC bias can significantly change both the maximum strength of the interface and the residual resistance of ice-steel specimens.

Figure 10:
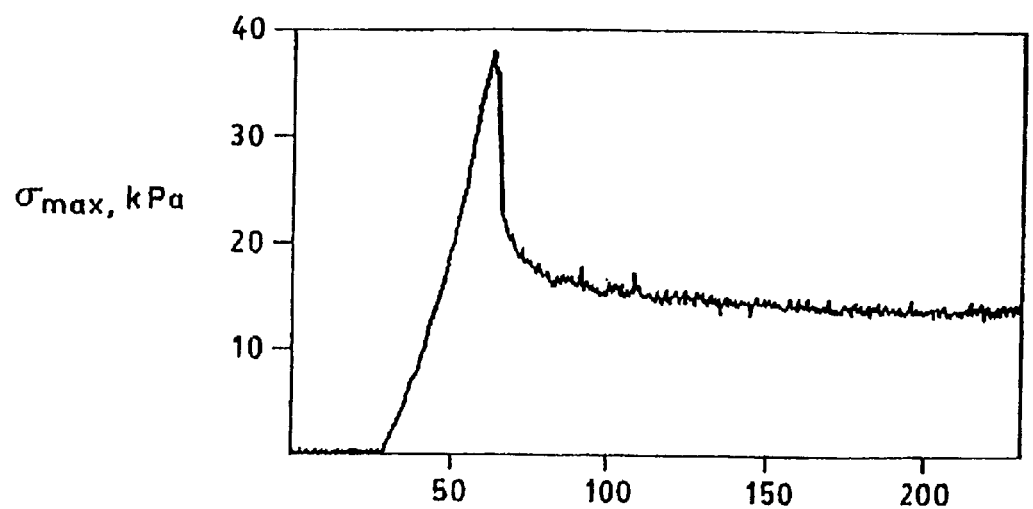
FIG. 10 graphically illustrates shear stress vs. time for an ice-stainless steel interface measured with the system of FIG. 8 with +6.6 V applied to the mobile steel electrode, the ice sample grown from 0.5% solution of NaCl in distilled water and tested at −10° C. under constant strain rate of 100 μm/min.
Figure 11:
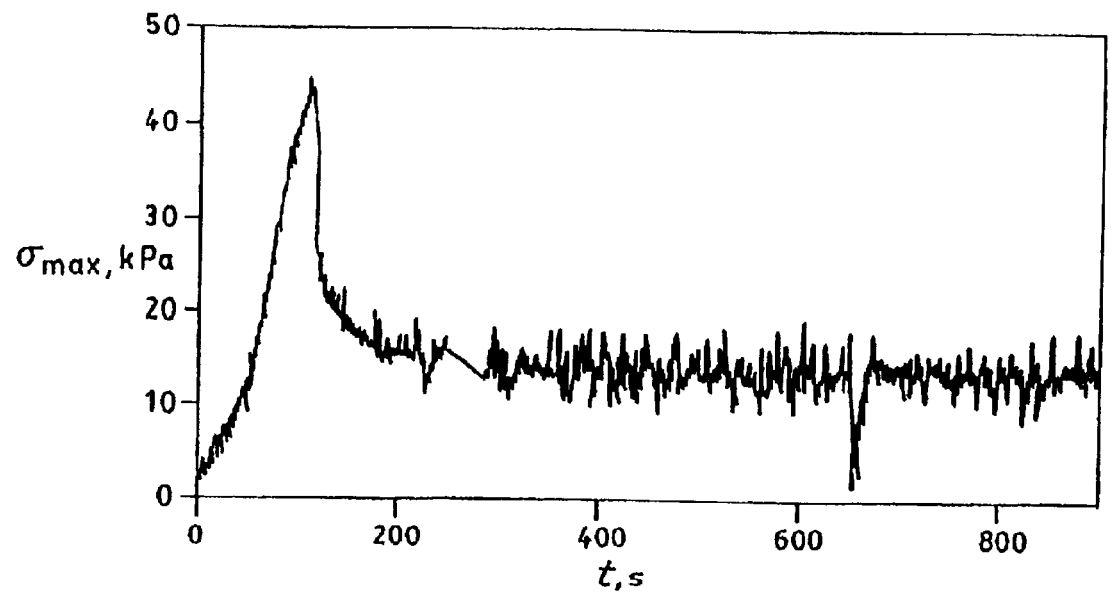
FIG. 11 graphically illustrates shear stress vs. time for an ice-stainless steel interface measured with the system of FIG. 8 with −1.8 V applied to the mobile steel electrode, the ice sample grown from 0.5% solution of NaCl in distilled water and tested at −10° C. under constant strain rate of 100 μm/min.
Figure 12:
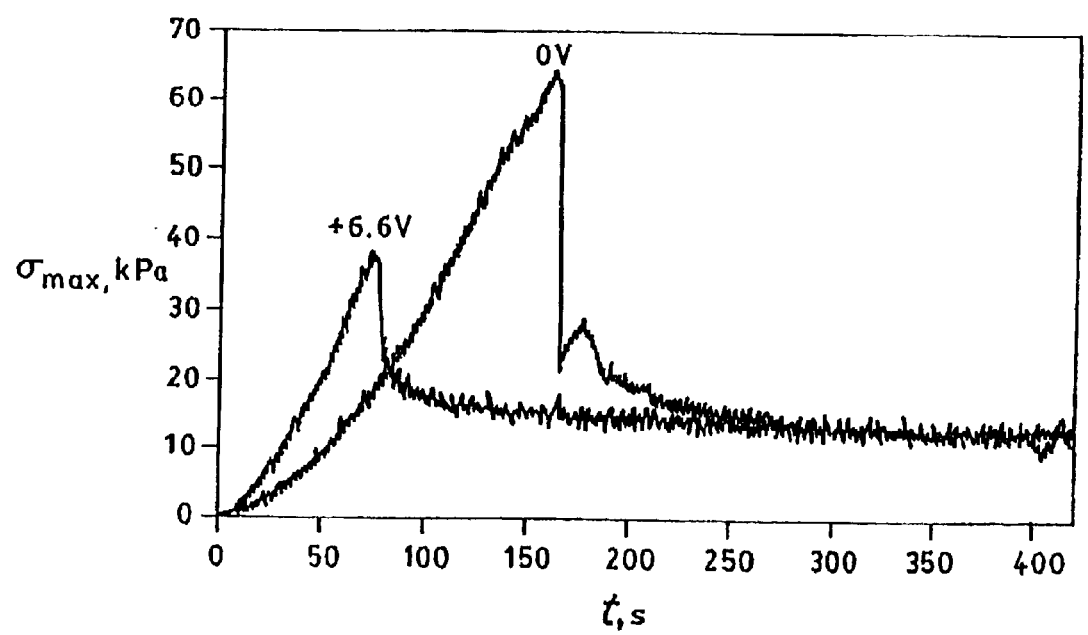
FIG. 12 graphically illustrates the effect of +6.6 V on the interfacial strength using data of FIGS. 9 and 10.

FIG. 10 shows results of a typical mechanical test performed on an ice-steel interface when +6.6 V is applied to the inner (mobile) tube 52a. FIG. 11 shows results similar to that of FIG. 10 when −1.0 V is applied to the mobile electrode. FIGS. 9 and 10 are combined in FIG. 12 to illustrate the effect of DC bias on interfacial strength. The results of such tests are summarized in Table 1 below, which illustrates that for voltages tested, a significant decrease in $\tau_{max}$ was observed. This effect was particularly large for V=+6.6 volts.

TABLE 1

Maximum interfacial strength $\tau_{max}$ and residual shear strength $\tau_{res}$ of ice-steel interfaces at T = −10° C. and ice doped with 0.5% NaCl.

| DC bias (volts) | $\tau_{max}$ (kPa) | $\tau_{res}$ (kPa) |
| --- | --- | --- |
| 0 | 64 ± 6 | 21 ± 2 |
| 6.6 | 37 ± 7 | 13 ± 3 |
| −1.0 | 45 ± 5 | 12 ± 2 |
| −1.8 | 48 ± 7 | 19 ± 3 |

Figure 12A:
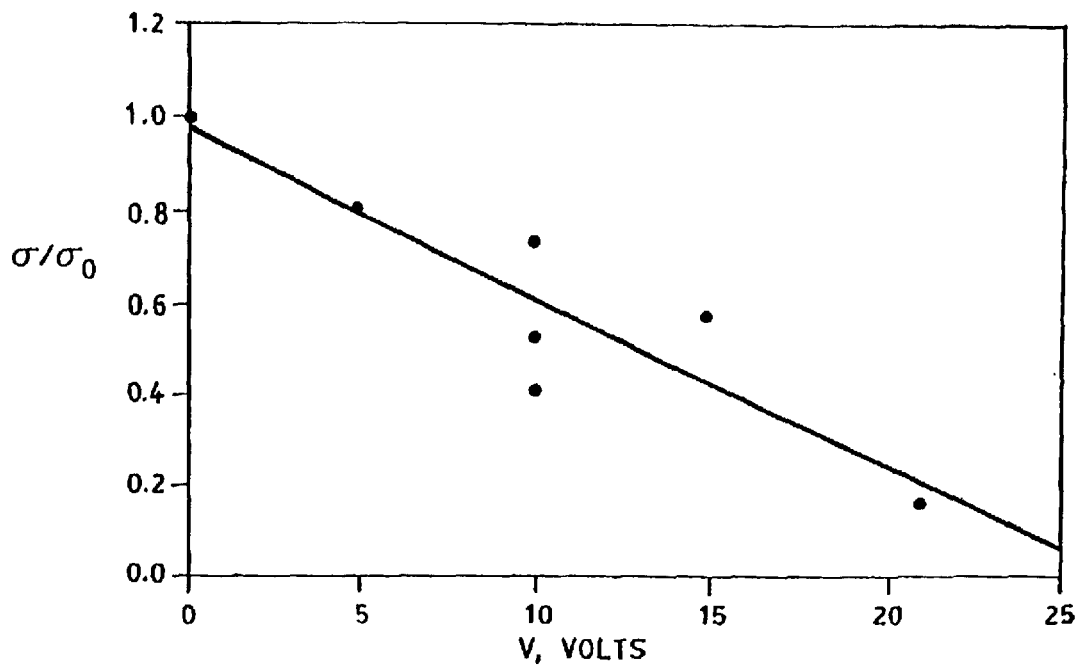
FIGS. 12A and 12B graphically illustrate experimental data of −10° C. ice doped with 0.5% NaCl to assess relative strength of an ice/steel interface.
Figure 12B:
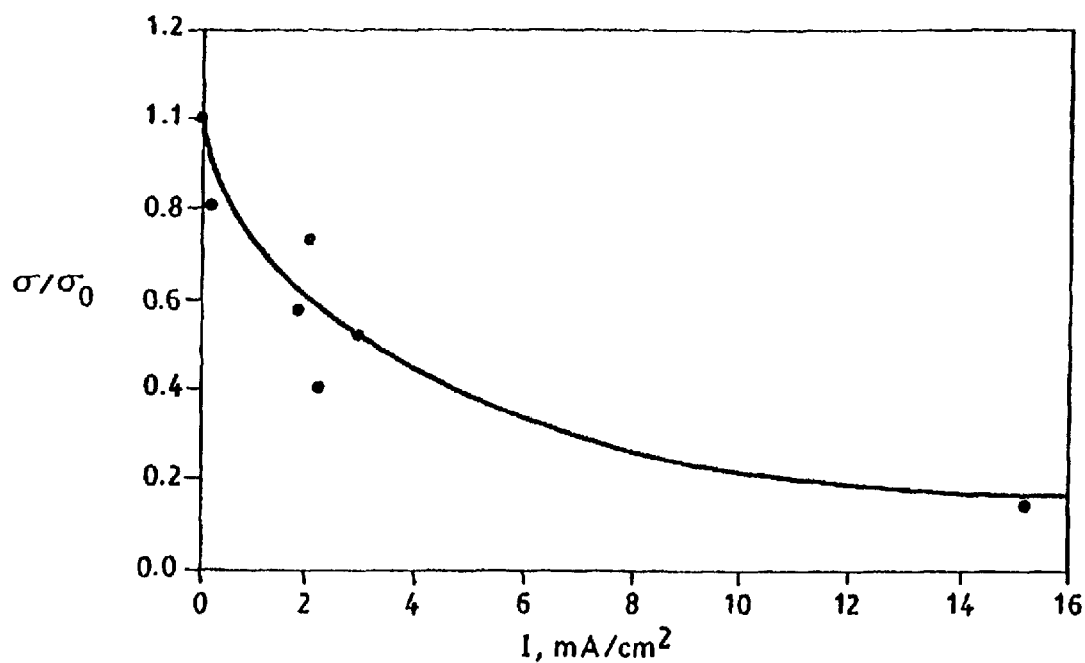
Figure 12C:
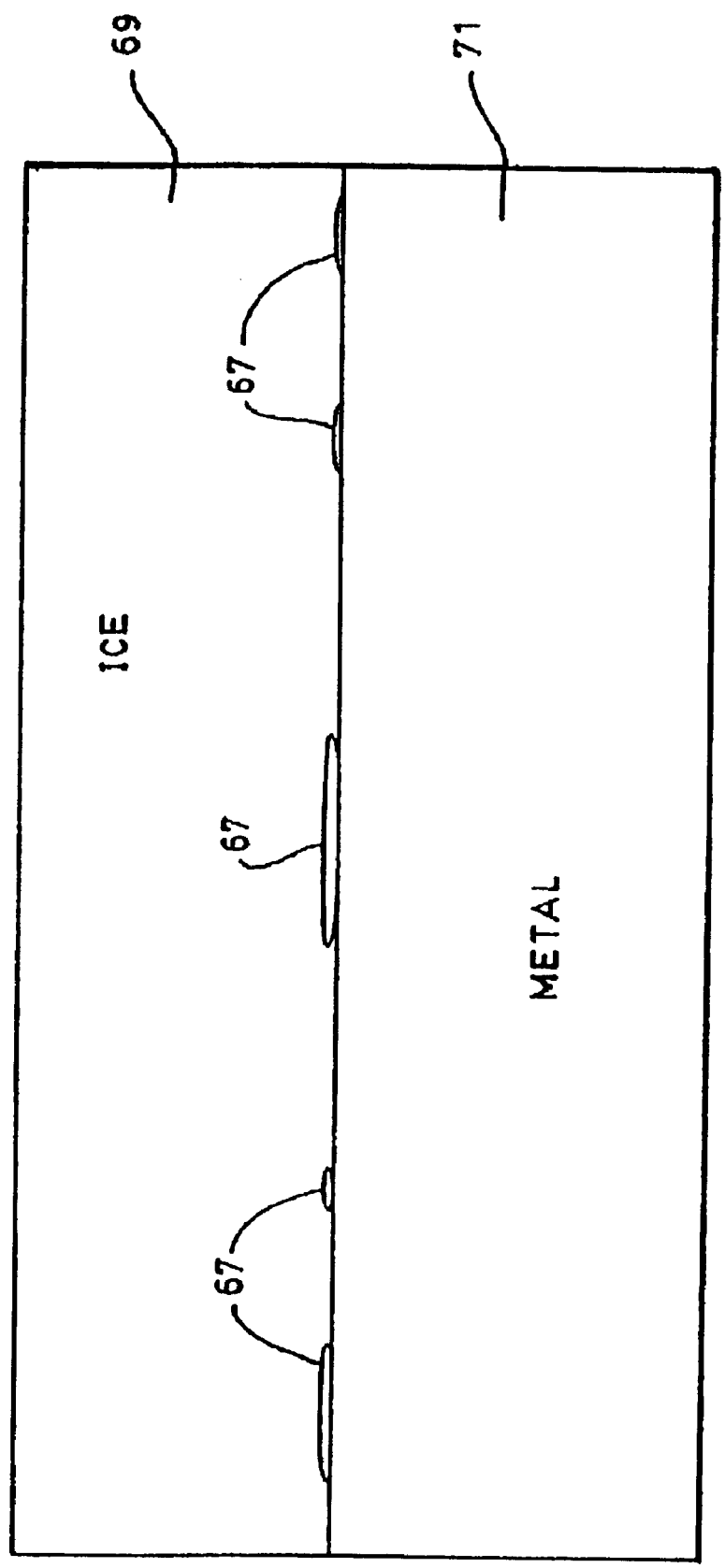
FIG. 12C illustrates how production of gas bubbles at an ice/metal interface functions as an interfacial crack to reduce interfacial strength.

In most recent tests, as shown in FIGS. 12A and 12B, we found that the relative strength of an ice/steel interface can be reduced by almost one order of magnitude when V=−21V is applied to the electrode. $\sigma_0$ is the interfacial strength at V=0 and σ corresponds to V≠0. To explain such a dramatic drop in ice adhesion, factors other than the electrostatic interaction are involved. Namely, when DC current flows through ice, gaseous hydrogen ($H_2$) and oxygen ($O_2$) accumulate at the ice/steel interfaces in the form of small bubbles, due to ice electrolysis. As illustrated in FIG. 12C, these bubbles 67 play a role in development of interfacial cracks which appear when the interface (between the ice 69 and metal 71) is loaded, reducing the maximum interfacial strength.

Additional Testing and Commentary on Adhesion of Ice to Mercury

As previously discussed, FIGS. 1 and 2 show a strong and reversible effect of a small DC bias (−6V to +6V) on ice adhesion to Mercury. The effect was observed in ices doped with KOH, HF, and NaCl and was absent in very pure ice grown from deionized water. AC voltage of up to 40V did not cause any noticeable changes in ice adhesion.

This section reports further on the effect of a low DC bias applied across an ice-Hg interface on the interfacial energy and on the work of adhesion. This section also reports the fraction of ice-metal interfacial energy that is due to long-range electrostatic interactions.

As reported above, a liquid-solid interface was used instead of a solid-solid one. Indeed, the interfacial energy which determines the adhesion is reliably measured in contact-angle experiments when one material is liquid and the other is solid, as in the water-metal case. A similar technique can be employed for an ice-metal interface if the metal is in the liquid phase. Mercury, with its melting point of −38.83° C., low chemical activity, and easily prepared clean surface, is well suited for such experiments.

Electronic grade 99.9998% pure mercury was used as well as polycrystalline ices grown from: 1) very pure deionized water; 2) distilled water; 3) untreated tap water; or 4) deionized water doped with small concentrations of laboratory grade NaCl, KOH, or HF. Most of the experiments were carried out inside a large cold room at T=−10° C. and relative humidity 89% to 91%. Some experiments were performed at temperatures of −5° C., −15° C., and −20° C. The temperature control was ±0.2° C.

To measure the surface tension of an ice-Mercury interface, two techniques were employed. For demonstration purposes, the first technique was a conventional contact-angle method with a drop of mercury on a flat, smooth ice surface, schematically shown in FIG. 2. Before the contact-angle measurements were made, the ice surface was smoothed by a microtome machine and polished on an optically smooth quartz plate.

The second technique used the manometer system of FIG. 3, which is more precise and reproducible in the case of the ice-Mercury interface. Pure or doped water was placed into a quartz tube 31 and frozen inside the cold room at T=−10° C. The quartz tube 31 had an internal diameter of 10 mm and contained a stainless-steel cylindrical mesh electrode 30 and a thin stainless-steel wire stretched along the tube's axis. After the water was frozen, the wire was carefully pulled out, producing a thin circular capillary 33 with very smooth walls. The capillary's radius, r, was either 0.5 or 0.25 mm. Prior to the surface tension measurements, the capillary was filled with liquid mercury from the mercury tank 19. In order to work with a fresh mercury surface during the measurements, the mercury 18' was regularly pulled back to the mercury tank 19 and then pushed down to the capillary 33. We measured the difference, h, in the mercury levels in the capillary and in the tank for an advancing and retracting mercury front. Two main factors have limited the precision of the technique. First, due to hysteresis in adhesion, even for a fresh mercury surface, we observed a small difference in h measured for an advancing and retracting front, $\Delta h \approx \pm 0.5$ mm. Second, due to the granular structure of the ice, which had a typical grain size of 1 mm, the image of the mercury inside the capillary was not sharp; this introduced additional error of about 0.2 to 0.3 mm. The resulting error, shown in diagrams and in the text, corresponds to the standard deviation of our tests.

In equilibrium, the mercury level difference h is given (again) by equation (2). When h is measured, equation 2 is also used to calculate $W_{i/a} - W_{i/Hg}$, and hence the work $W_A$ of ice adhesion to a liquid metal:

$$W_A = (W_{i/a} - W_{i/Hg}) + W_{Hg/a} \quad (12)$$

where $W_{Hg/a}$ is the energy of the Hg/air interface. $W_{Hg/a} = 493$ mJ·m$^{-2}$ at $-10°$ C. See, Jasper, J. Phys. Chem. Ref. Data, 1, 841 (1972). The contact angle of mercury on ice, $\theta$, can be calculated from these experimental data and as a function of DC bias as:

$$\theta = a\cos((W_{i/a} - W_{i/Hg})/W_{Hg/a}) \quad (13)$$

Experimental Results

On the doped ices, a small DC bias had a strong effect on the ice-Mercury interfacial energy. The magnitude and sign of the energy change $\Delta(W_{i/a} - W_{i/Hg})$ depends on the polarity and magnitude of the bias and on the type and concentration of dopants. The effect of different biases on the shape of a mercury drop on ice doped with NaCl is shown schematically in FIG. 1. Table 2 shows $\theta$, calculated using equation (13), for ice 20' doped with different impurities and under different DC biases applied between the mercury and the mesh electrode.

TABLE 2

Contact angle $\theta$ of mercury on ice grown from water containing different dopants and under different DC biases applied between the mercury and the mesh electrode, positive voltage corresponding to a positive potential on mercury.

| | Contact Angle $\theta$ | | |
|---|---|---|---|
| Ice Dopant | 0 V | −1.75 V | −5 V |
| 0.5% NaCl | 101 ± 3.5° | 116 ± 4° | 77 ± 4° |
| 0.2% KOH | 113 ± 9° | | |
| 0.18% H | 105 ± 6° | | |

Figure 13:
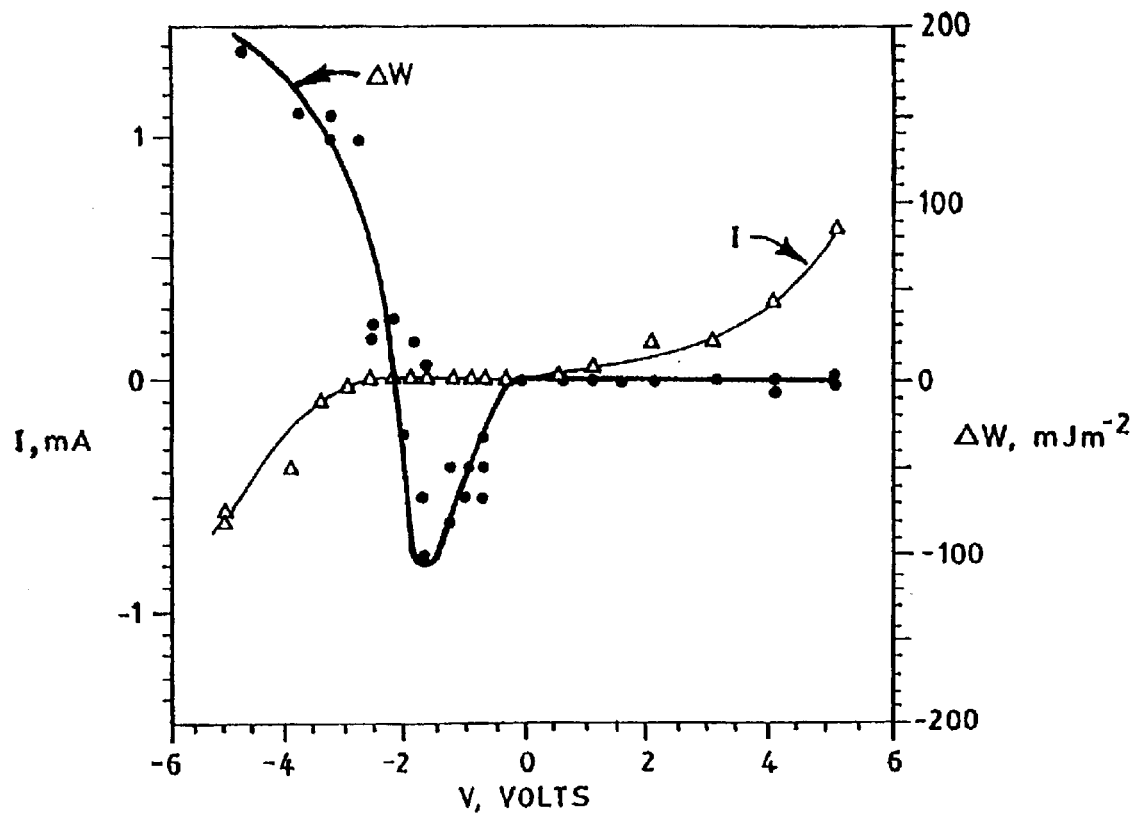
FIG. 13 shows a graph of experimental results including $\Delta W_A = \Delta(W_{i/a} - W_{i/Hg})$ and the current I versus DC bias V, ice being grown from water doped with 0.5% NaCl, T=−10° C., and $W_A(0) = 400 \pm 10$ mJ/m$^2$.

FIG. 13 graphically shows the change in the work of adhesion $\Delta W_A = \Delta(W_{i/a} - W_{i/Hg})$ versus bias V, measured by the "manometer" of FIG. 3, at T=−10° C., for ice grown from water doped with 0.5% NaCl. As shown, the bias can reduce or enhance adhesion of ice to mercury. When the bias does not exceed 6V, the effect becomes very pronounced for NaCl concentrations above 0.05%. The positive bias corresponds to a positive potential on the mercury. Because of the minimum in the $W_A(V)$ dependence, which is seen at −1.75V after a negative potential of $\leq 2V$ is applied, the mercury column first moves down and then up.

Figure 14:
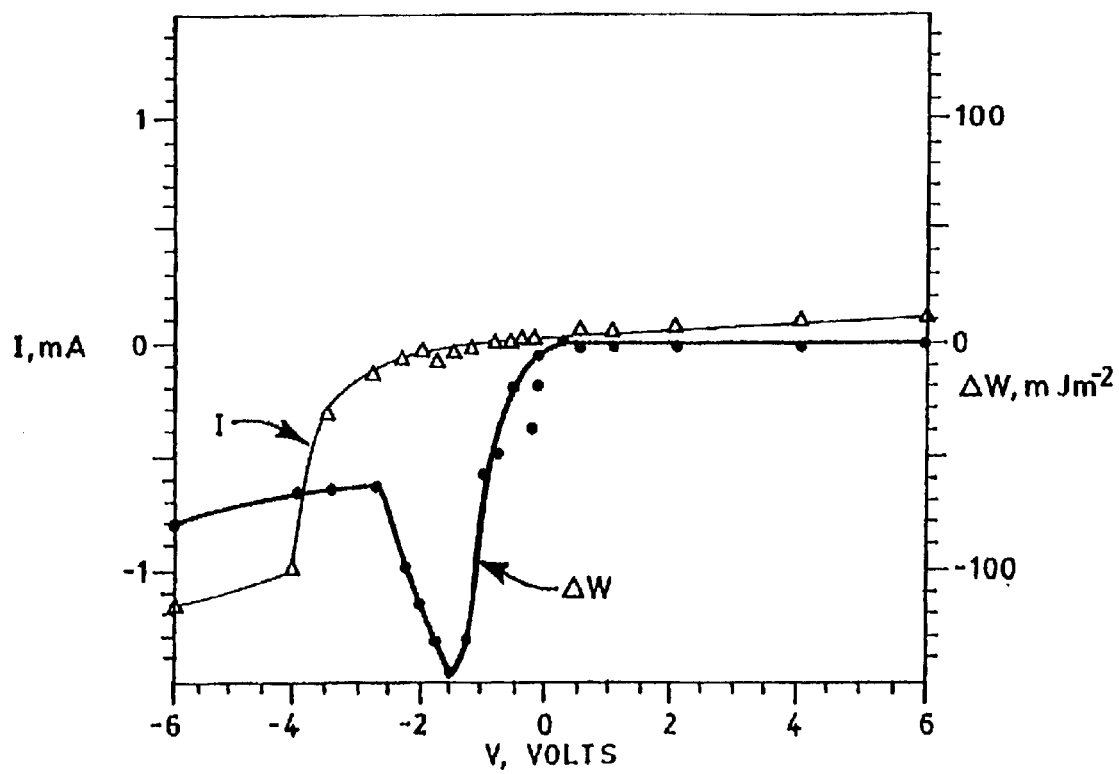
FIG. 14 shows a graph of experimental results with $\Delta W_A = \Delta(W_{i/a} - W_{i/Hg})$ and the current I versus DC bias V, ice being grown from water doped with 0.18% HF, T=−10° C., and $W_A(0) = 360 \pm 15$ mJ/m$^2$.
Figure 15:
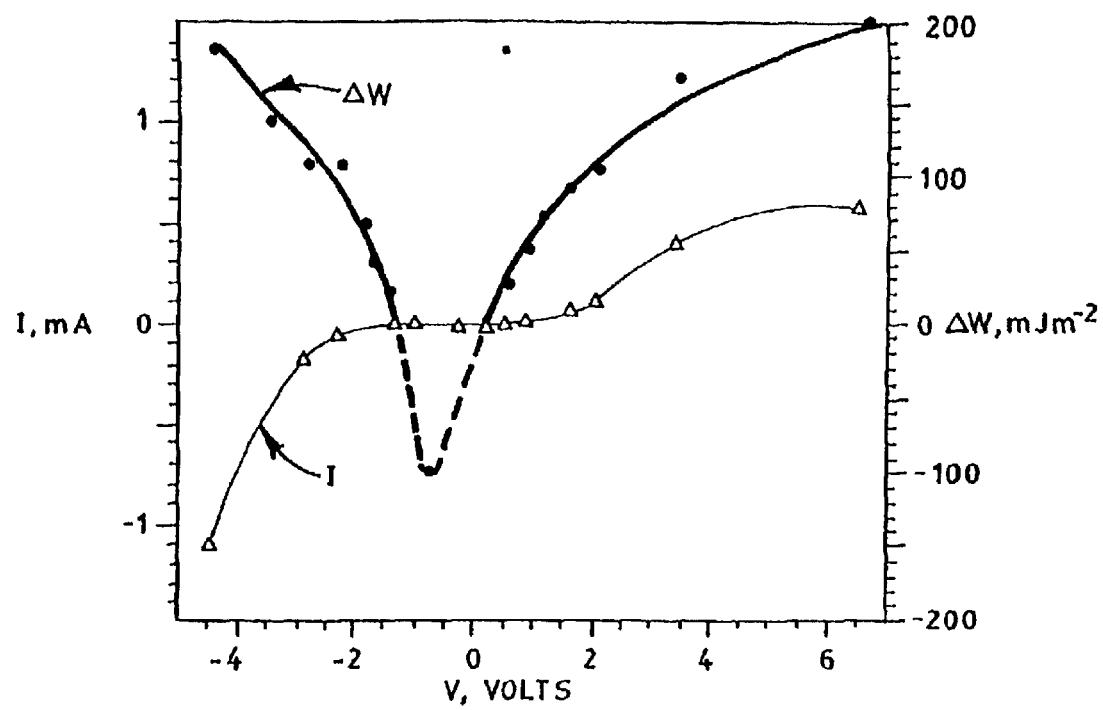
FIG. 15 shows a graph of experimental results with $\Delta W_A = \Delta(W_{i/a} - W_{i/Hg})$ and the current I versus DC bias V, ice being grown from water doped with 0.2% KOH, T=−10° C., and $W_A(0) = 293 \pm 25$ mJ/m$^2$.

At lower concentrations of NaCl (<0.05%) or with ice grown from tap water, the effect was smaller, while in ice doped with 0.5% NaCl, the mercury begins to move immediately after the bias is applied. In most pure ice grown from deionized water, a DC bias of up to 40V did not produce any noticeable change in ice adhesion to mercury. When doped ice was used the effect was completely reversible; i.e., $W_{i/Hg}$ was restored after the bias was shut off. Nevertheless, on several occasions, as mentioned above, hysteresis was observed in the motion of mercury. The maximum observed change in h was 12 mm for r=0.25 mm. FIGS. 14 and 15 show the effect of a DC bias on $\Delta W_A$ of ice doped with HF and KOH, respectively.

The effect of a DC bias on adhesion of doped ices to mercury was also observed at −5° C., −15° C., and −20° C., but most of the measurements were performed at −10° C. The reason for this is that −5° C. doped ice contains many tiny liquid inclusions, while −20° C. ice often cracks inside the apparatus.

Measurements of current-voltage characteristics showed that it was the voltage, not the current, that caused the changes in ice adhesion (see FIGS. 13–15). For example, $\Delta W_A$ passes through minima of the same magnitude and located at the same voltage in ice samples whose conductivity differed by a factor of 20. Electrical heating did not play any role in the effect either, because for voltages below the threshold of ice electrolysis (±2V) the current was measured in singles and tens of $\mu A$ and the estimated rate of the temperature change was less than $10^{-6°}$ C./s. Thus, the effect of electrical heating was neglected.

Due to the low solubility of all impurities in solid ice, dopants dissolved in water are ejected by the growing ice front and are finally concentrated in the grain boundaries and on the ice surface, increasing their electrical conductivity. In the results of this section, the measured DC current is a sum of the bulk, surface, and grain-boundary currents.

Figure 16:
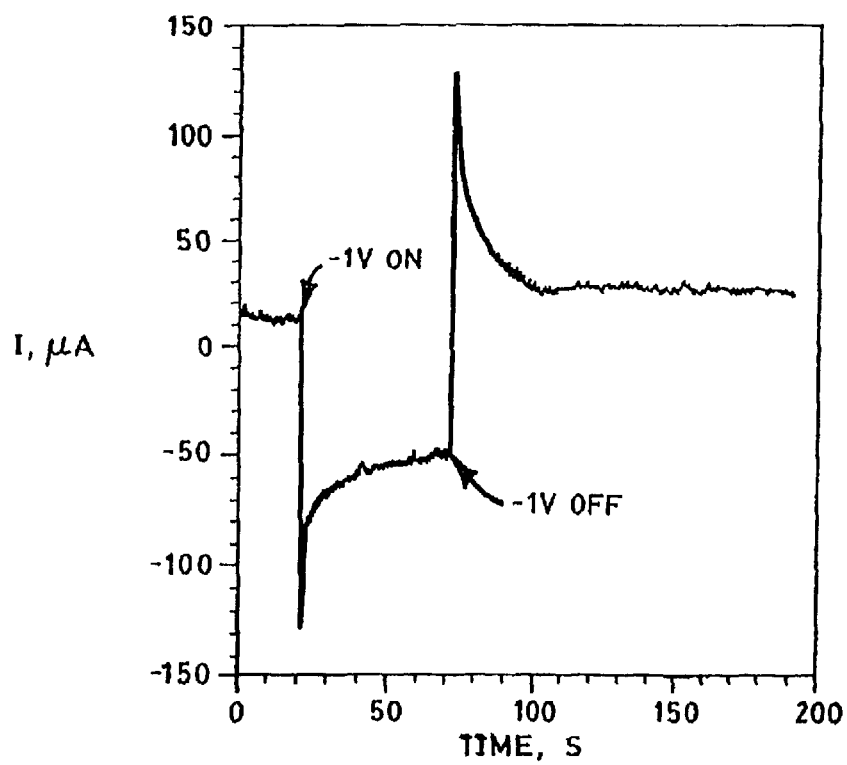
FIG. 16 shows a graph of experimental results, including current versus time for an ice specimen grown from a 0.2% solution of KOH, T=−10° C., where −1V was applied to the mercury.

In electrochemistry the peaks of current, shown in FIG. 16, when the bias was "on" and "off" are usually explained in terms of build-up and decay of an electric double layer at electrolyte/metal interfaces. The large currents ($\geq 1$ mA) used for $|V|>2V$ were not stable, but steadily decayed over time. To plot them versus voltage, current was measured twenty seconds after the bias was switched "on". To prevent the accumulation of electrode polarization, the polarity of the bias was reversed every time. Thus, the measurements were performed in a sequence of +0.2V, −0.2V, +0.4V, −0.4V, etc.

The application of AC voltage, up to 40V in amplitude and in the frequency range 10 Hz to 10 kHz, did not produce any noticeable changes in $W_A$. As mentioned above, in pure deionized water, the application of a DC bias of up to 40V did not produce noticeable changes in $W_{i/Hg}$. It takes 1 kV to 3 kV to change the adhesion of very pure ice to a metal. The different reactions of pure and doped ices to a DC bias are attributed to the differences in their electrical conductivities. Accordingly, certain embodiments of the invention utilize electrical "feedback" to gauge ice conductivity, in real time, and to select the DC bias based on this measurement, to minimize the adhesion strength for a given ice-material interface. Those skilled in the art should appreciate that adhesion strength can also be increased in real time and based upon the same feedback, if desired; or both.

When ice was doped with NaCl or HF and a DC bias exceeded the electrolysis threshold with positive potential on the Mercury, the appearance of a yellowish oxide film appeared on the mercury surface. The film disappeared in a few seconds after the bias was reversed. However, with a negative potential applied to the mercury, there was no noticeable color change in the stainless-steel mesh electrode. This electro-corrosion of the mercury surface may be responsible for the asymmetry of $\Delta W_A$ versus V dependencies shown in FIGS. 13 and 14. In the case of ice doped with 0.2% KOH, there was also no noticeable color change of ice/Hg interfaces associated with electro-corrosion.

Other possibilities exist for anomalies in the data. For example, a stainless-steel-doped ice-mercury sandwich behaves as a weak battery, generating a small electromotive force (EMF) with a negative potential on the mercury. This EMF was −0.18V for ice doped with 0.5% NaCl and −0.3V for ice doped with 0.2% KOH. Other physical mechanisms could also contribute to the above-reported effects: 1) electrostatic interactions of electrical charges in an electric double-layer of the ice-metal interface; 2) electro-oxidation and electro-reduction (redox) of the metal surface; and 3) exfoliation of the ice/metal interface, caused by the gases liberated in the electrolysis of ice. These are briefly discussed below.

Electrostatic Interaction

Due to redox reactions, there are always potential differences, $V_c$, between a metal electrode and an electrolyte (ionic conductor). Thus, the standard potential $V_o$ of Mercury is +0.7958V at 25° C. The real potential between a Mercury electrode and a particular electrolyte depends on the electrolyte's pH, varying from about +0.9V in very acidic solutions to about +0.2V in very alkaline solutions. See, Oldham, *Fundamentals of Electrochemical Science*, Academic Press, New York, pp. 309–355 (1994). The electric double-layer on the interface associated with this contact potential $V_c$ consists of an atomically thin, positive charge of density +λ on the mercury and an ionic space-charge −λ in the subsurface layer of the electrolyte. The energy of the interfacial electric field is given by:

$$W'_{I/Hg} \approx \frac{\lambda V_c}{2} \approx \frac{C(V) \cdot V_c^2}{2} \qquad (14)$$

where C(V) is an "apparent" interfacial capacitance that itself depends on $V_c$. The electrostatic portion of the work of adhesion is then given by:

$$W'_A = \frac{C(V) \cdot V_c^2}{2}. \qquad (15)$$

When an external bias V is applied to the interface, $W_A'$ is given by:

$$W'_A = \frac{C(V) \cdot (V_c + V)^2}{2} \qquad (16)$$

which predicts a minimum in $W_A'$ at $V=-V_c$. This type of dependence is seen in FIG. 15, in the left side (V<0) of FIG. 13, and in the part of FIG. 14 in which −3V<V<0. The absolute value of $W_A'$ can be compared with the prediction of equation (16) and with experimental observations. To estimate C, a time constant of τ≈10 s is used with which the current rises and decays in FIG. 16:

$$C \approx \frac{2\tau}{R \cdot S} \qquad (17)$$

where R is the resistance of a steel/ice/mercury sandwich; R≈1V/50 μA=2·10⁵ Ω; S is the area of the ice-Hg interface. The two factor appears due to the presence of the stainless-steel/ice interface, which is assumed to be identical to the ice-Hg interface. This provides an order-of-magnitude rough estimate.

Equation (17) calculates C at an approximate value of 0.4 F/m², which is quite typical for electrode capacitance when metals are immersed in concentrated electrolytes. Substitution of C≈0.4 F/m² and the mercury standard potential $V_c$≈0.8V into equation (16) results in the following minimum of $W_A'$:

$$\Delta W_A = W_A'(0) - W_A'(V_c) \approx 160 \; mJ/m^2 \qquad (18)$$

This result is comparable with the above results ($\Delta W_A$= 100–150 mJ/m²). Deviation of experimental results from equation (16) may be due to the other effects discussed herein.

The position of the minima in $W_A$ are −1.75V for HF- and NaCl-doped ices, which is about double the expected $V_c$ of Hg in an acidic electrolyte. But, the applied bias V is shared between the ice-stainless steel interface, ice-bulk, and ice-Hg interface. If below the threshold of ice electrolysis V is shared almost equally between two interfaces, then the observed minima are right in place at $-2V_c \approx -1.8V$. Notice that on freezing, NaCl enters ice as Cl⁻ and H⁺, leaving Na⁺ and OH⁻ outside ice, and making NaCl doping similar to HCl doping. Since $V_c$ of mercury is smaller in alkaline electrolytes, the minimum of $W_A$ for KOH-doped ice must be at a lower negative voltage, and it is (see FIG. 15).

Oxidation and Reduction

As noted above, a yellowish film was observed with the mercury oxide (which is red in bulk) when a positive potential was applied to the mercury in contact with acidic (HF- and NaCl-doped) ice. Most probably, this film destroys the nice symmetry of $W_A(V)$ dependence, predicted by equation (16) and seen in FIG. 15 for KOH-doped ice.

Gases Released in Electrolysis

Gas release for |V|≧2V can cause exfoliation of the ice-metal interface and thus decreases the work of adhesion, $W_A$. Such a decrease is not seen in FIGS. 13–15 (although there may be some in FIG. 14 at V<−2V) even though a current of 1 mA generates approximately 0.15 mm³/s of (H₂+O₂) at atmospheric pressure. Perhaps the gases easily escaped upward along the ice-Mercury interface. Nevertheless, in the case of an ice-solid metal interface, the gases generated by ice electrolysis can crack the interface, thus reducing ice adhesion strength.

Other Interactions

Supposing that at the minima of $W_A(V)$ the electrostatic interaction between space charges sitting on the metal and on the ice is zero, the reminder, $W_A(0)-\Delta W_{min}$, is equal to 190±25 mJ/m² for an alkaline-ice/Hg interface and 290±10 mJ/m² for an NaCl-doped-ice/Hg interface. Then, what is left may be attributed to Lifshitz-Van der Waals and polar Lewis acid-base interactions.

The effect of a relatively small DC bias (−6V<V<+6V) on ice adhesion to Mercury is thus demonstrated. Depending on the bias polarity and magnitude, the work of adhesion can be decreased by as much as 37–42% or increased by up to 70%. In this small bias range, the effect was not observed on very pure ice or under AC voltage. Electrostatic interactions of the electrical charges in the interfacial electric double layer is the most plausible major mechanism of the phenomenon, with some contributions of electrolytic gas-release and metal oxidation.

Figure 17:
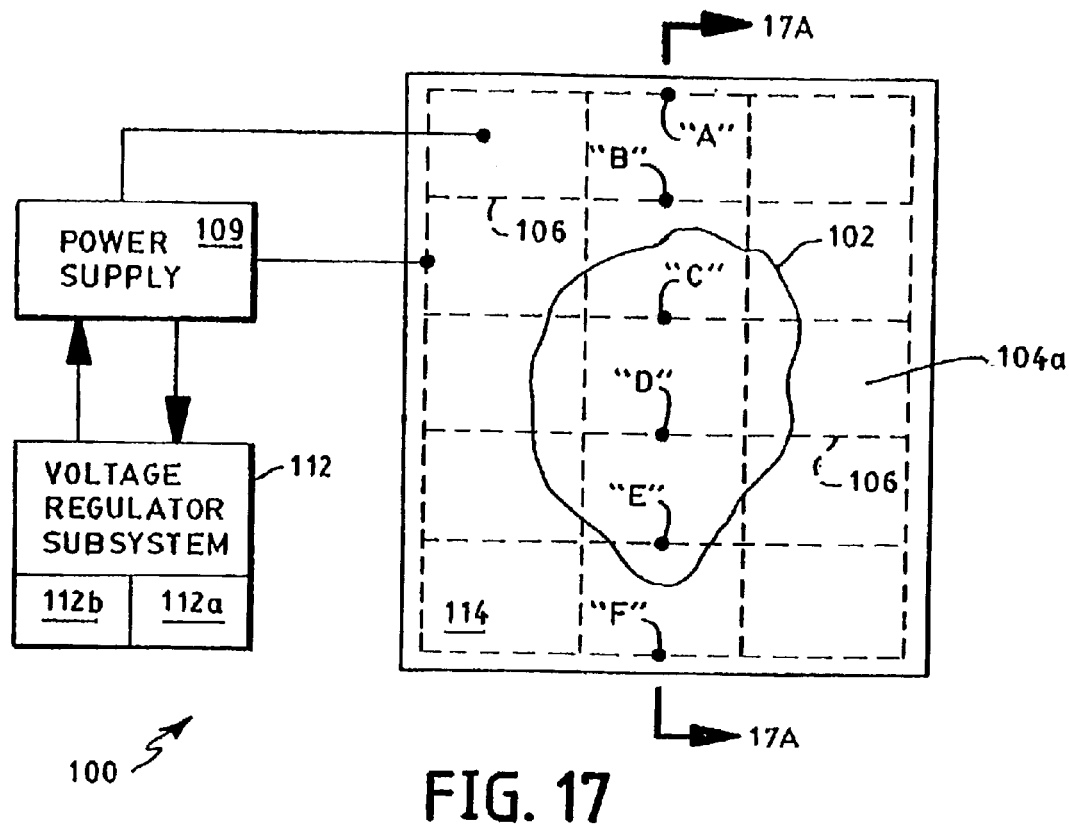
FIG. 17 illustrates one system constructed according to the invention for modifying ice adhesion to a generic conductive (or semiconductor) material.

FIG. 17 (and cross-sectional view 17A) illustrate a system 100 constructed according to the invention. System 100 operates to reduce the adhesion of ice 102 formed onto the surface 104a of a material 104. The system 100 forms a circuit that includes the material 104, a conductive grid 106 (including illustrative points "A"–"F" on the grid), and a power supply 109. The grid 106 is suspended above the surface 104a so that it remains electrically insulated from the material 104.

Figure 17A:
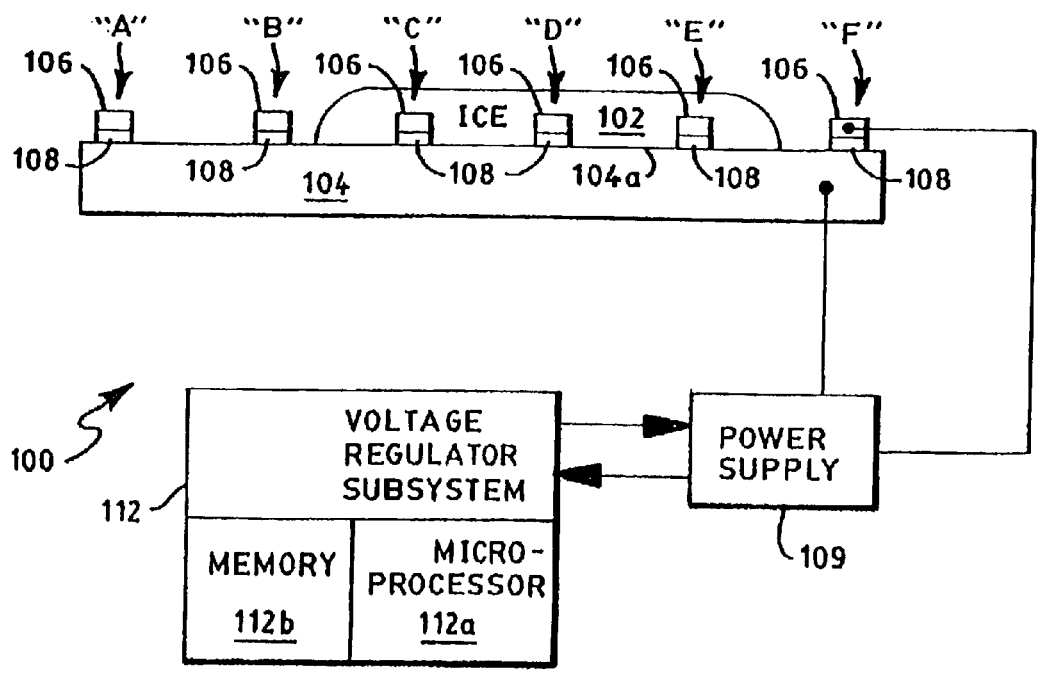
FIG. 17A shows a cross-sectional view (not to scale) of the system of FIG. 17.

In a preferred embodiment of the invention, the suspension of the grid 106 over the surface 104a is obtained through use of an insulating grid 108 disposed between the grid 106 and the surface 104a. FIG. 17A illustrates the grid 108 in greater detail. The cross-sectional view of FIG. 17A is not to scale so as to illustrate the relationship of the insulating grid 108 and the conducting grid 106. In reality, the thickness (in the dimension of FIG. 17A) of the grids 106, 108 can be much smaller than an inch (even as low as 0.010 to 0.020 inch); and can be considered as "coatings". By way of example, the grid 108 can be made from a thin coating of electrically insulating paint; while the grid 106 can be made from a thin coating of electrically conductive paint. The grid 106 is connected so as to function as a single electrode. The material 104 thus becomes a first electrode of the system 100; and the grid 106 becomes the second electrode in the circuit.

Grids 106, 108 can also be pliant and formable over the surface 104a, which can represent any shape even though a flat surface 104a is shown. By way of example, the material 104 can represent an aircraft wing or a car windshield; and the grids 106, 108 are conformal to the structure material 104.

When ice 102 forms onto the surface 104a, the circuit of system 100 is completed as the ice 102 operates as a semiconductor (as discussed above). When the circuit is completed, the power supply 109 provides a DC bias to the interface between the ice 102 and the material 104. The bias is typically less than a few volts; and thus a battery can function as the supply 109.

The magnitude of the bias depends upon the desired application. In the case of a car windshield or an airplane wing, the bias is selected so that a minimum (or near-minimum) ice adhesion results, thereby facilitating the removal of the ice 102 from the material 104.

However, in the case of a boot heel, for example (i.e., where the surface 104a is the bottom of the sole of a shoe), the ice 102 represents ice beneath the heel; and the bias is selected so as to increase the normal ice adhesion strength between the ice and the heel, thereby increasing friction between the shoe and possibly preventing a slip on the ice.

A voltage regulator subsystem 112 is also preferably connected in circuit with the system 100. As described in more detail below, the voltage regulator subsystem 112 operates in feedback with the circuit and the supply 109 so as to decrease or increase the DC bias in an optimum fashion. By way of example, the subsystem can include circuitry and a microprocessor 112a to measure data from the circuit and to determine the conductivity (and/or temperature) of the ice 102. Such measurements are used in turn by the subsystem 112 to generate a signal which effectively changes the amount of the DC bias applied to the circuit. Specifically, in one embodiment, the power supply 109 is responsive to the signal to generate the right voltage at the ice-material interface. The value of the DC bias can be stored in memory 112b within the subsystem 112 such as through a look-up table and based upon experimental data. For example, ice with a conductivity of "X" (as measured by the subsystem, in real time preferably) in contact with a material 104 of conductivity "Y" (known a priori, as the system 100 is installed with the material 104 for a given application) will be used through the look-up table in memory 112b to determine which voltage to apply to the ice-material interface.

The grid electrode 106 is preferably spaced so as to ensure (as best as possible) that ice 102 formed onto the surface 104a will contact at least some portion of the grid 106. With reference to FIG. 17, for example, the ice 102 comes in contact with several areas of the grid 106, including at points "C"–"E". Accordingly, the circuit of system 100 will be completed as the ice 102 "shorts" at least one part of the grid to material electrodes 106, 104, respectively.

The actual size of the spacing between conductive areas of the grid 106—for example, the area 114 of FIG. 17—should be sized for the specific application. By way of example, if the surface 104a is the surface of an aircraft wing, then the spacing can be relatively large, e.g., greater than one square foot. However, for a car windshield, area 114 should be smaller, if desired, so that smaller ice deposits on the windshield (such as in the corners of the windshield) are likely to short to the grid 106.

Figure 18:
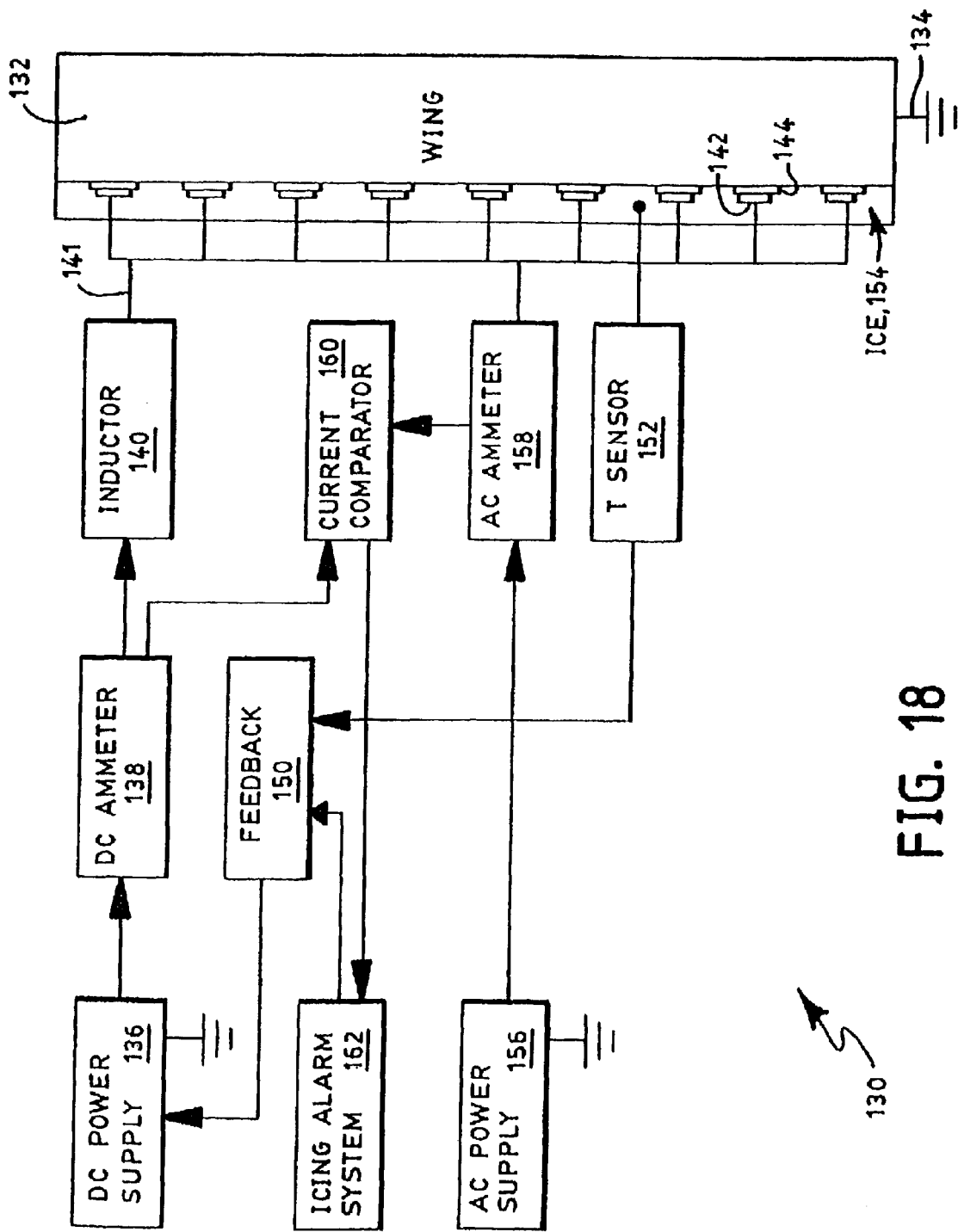
FIG. 18 illustrates one system of the invention for decreasing the ice adhesion strength of ice that forms on an aircraft wing.

FIG. 18 illustrates a system 130 constructed according to the invention. One electrode of the subsystem 130 is the aircraft wing 132. The aircraft wing 132 is electrically coupled to ground 134. A DC power supply 136 is electrically coupled to a DC ammeter 138. The DC ammeter 138 is electrically coupled to an inductor 140. The inductor 140 is electrically coupled through wiring 141 to a conductive paint 142 (or other wing-conformal, conductive equivalent) which is applied to the insulating layer 144 fixed on the aircraft wing 132.

Figure 19:
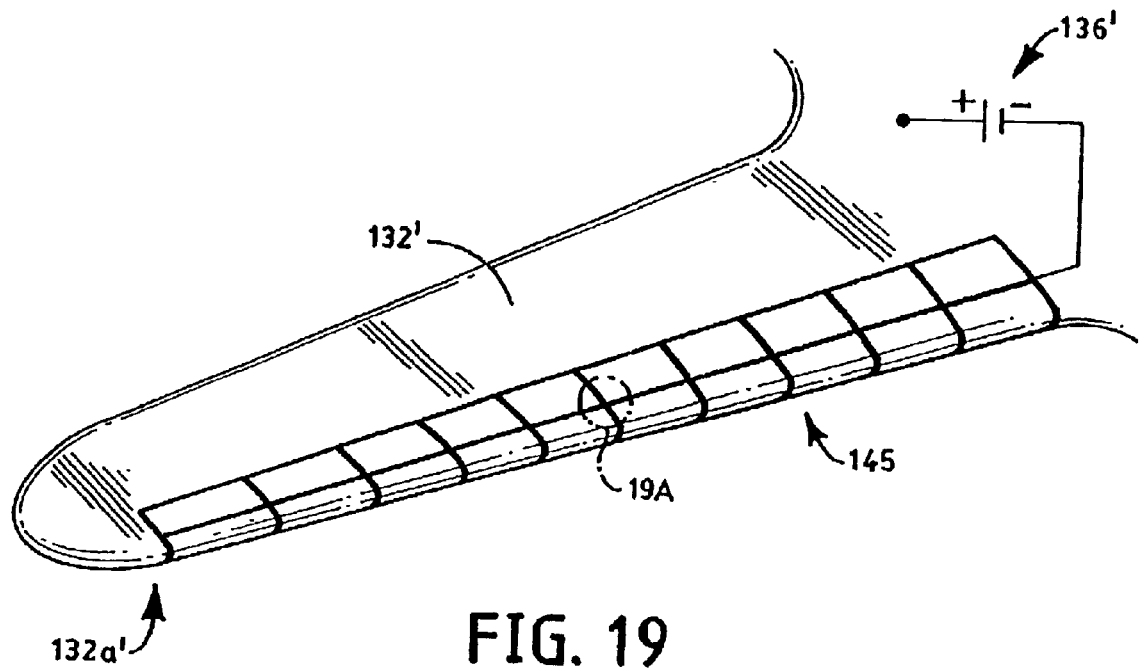
FIG. 19 illustrates a conductive paint/insulating lacquer grid constructed according to the invention and for forming over an aircraft wing.
Figure 19A:
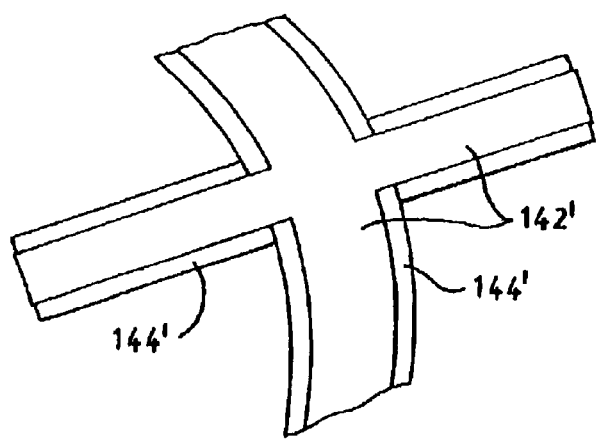

The insulating layer 144 and paint 142 are preferably arranged as a grid pattern, such as described in connection with FIG. 17 and shown further in FIG. 19. In FIG. 19, the conductive layer 142' on the wing 132' and the insulating layer 144' (shown here as an insulating lacquer) form a grid pattern 145. Accordingly, the power supply 136' connects to the conductive paint 142' and to ground through the wing electrode 132'. As ice forms on the wing 132', the circuit is shorted by the ice and a DC bias is applied at the ice-wing interface so as to reduce ice adhesion and to facilitate ice removal.

Preferably, the total area covered by the insulating lacquer 144' does not exceed about 1% of the front edge 132a' of the wing 132'. The grid pattern 145 can be sized and arranged over the front 132a', as shown, or over the entire wing 132', or over some other area as a matter of design choice. A wing or aircraft manufacturer who has historical or other data on typical ice deposits for the particular wing or aircraft can thus apply the grid 145 over that particular region only, if desired.

The voltage applied between the wing 132 and 132' of FIGS. 18 and 19, respectively, is generally adjusted to between one and six volts, with a corresponding current below 1A per m$^2$ of the grid area.

Those skilled in the art should appreciate that a wide variety of commercially available insulating lacquers 144' and conductive paints 142 exist; and that a particular brand should be chosen after testing of icing simulations. Furthermore, the optimal spacing of the grid 145 (i.e., to size the area 114 of FIG. 17) should also be determined experimentally or through analysis for a particular design.

With further reference to FIG. 18, the DC ammeter 138 can additionally couple to a feedback subsystem 150. The feedback subsystem 150 in turn electrically couples to the DC power supply 136 to "control" the DC bias applied to the wing-ice interface, depending upon characteristics such as ice conductivity and temperature. A temperature sensor 152 thus also preferably connects with the circuit 130 to measure the temperature of the ice 154.

Further features of the system 130 can include an AC power supply 156 (operating between about 10 kHz and 100 kHz) electrically coupled to an AC ammeter 158, which in turn electrically couples to the conductive paint 142. A current comparator 160 is electrically coupled to both the AC ammeter 158 and the DC ammeter 138.

An icing alarm subsystem 162 can also be included with the system 130. The current comparator 160 can for example couple to the icing alarm subsystem 144 and to the feedback subsystem 150 so as to initiate certain events, such as discussed below.

The DC ammeter can be used to measure the DC conductivity of the circuit 130. The DC conductivity signal measurement is provided to the feedback subsystem 150, which in turn regulates the current supplied by the DC power supply 136, and to the current comparator 160.

The AC ammeter can be used to measure the AC conductivity of the circuit 130 within the applied frequency range of 10–100 kHz, for example. The AC conductivity signal measurement is provided to the current comparator 160 (and optionally to the feedback 150 for A/D and data processing). A comparison between the AC and DC conductivities is used by the system 130 to distinguish between water and ice, both of which "short" and complete the circuit. Specifically, the ratio of the AC to DC conductivity is 2–3 orders of magnitude greater in the case of ice as compared to water, providing a signal measurement which readily distinguishes ice over water.

As ice forms on the wing 132, therefore, the current comparator 160 signals the feedback subsystem 150 which in turn commands the DC power supply 136 to increase or decrease the DC bias at the ice-wing interface. The DC bias is selected at a magnitude (generally between one and six volts) so as to minimize ice adhesion strength of the ice 154 on the wing 132.

Upon deicing of the wing 132, the signal differential received by the current comparator 160 drops below a preset value; and the current comparator 160 deactivates the icing alarm 162. Simultaneously, the current comparator 160 signals the feedback subsystem 150 which in turn commands the DC power supply 136 to decrease the bias to the initial level.

In summary, the ammeters 138 and 158 are used to determine conductivity of the material which shorts between the grid electrode 142 and the wing 132. As shown, that material is ice 154. The system 130 thus distinguishes between ice and water in an automatic manner. The inductor 140 prevents AC voltage from entering the "DC" parts of the circuit, which should be accurately controlled to modify the ice adhesion strength. The feedback subsystem 150 can and preferably does include a microprocessor and memory to command and control the power supply 136 at a near-optimum DC bias based upon feedback data such as ice temperature and ice conductivity (and/or ice purity). The feedback circuitry preferably increases or decreases DC bias voltages at a level that provides a density of about 0.1 mA/cm$^2$ (or about 1 mA/in$^2$ current density at the ice-wing interface) after receiving an ice alarm signal from the subsystem 162. Accordingly, for a current of about 10–30 A, a total energy consumption of about 100–500 watts is required for a typical large airplane.

The "DC" parts of the circuit of FIG. 18 thus primarily operate to provide DC bias to the ice-wing interface, and, secondarily (if desired) to measure the DC conductivity of the ice 154. The "AC" parts of the circuit of FIG. 18 thus primarily operate to measure the AC conductivity. The remaining portions of the circuit of FIG. 18 thus provide: (a) an inductor to prevent signal coupling between the DC and AC parts; (b) feedback and measurement and control circuitry to control the applied DC bias based upon detection of ice (as compared to water) and/or measured feedback parameters such as ice temperature and conductivity.

Figure 20:
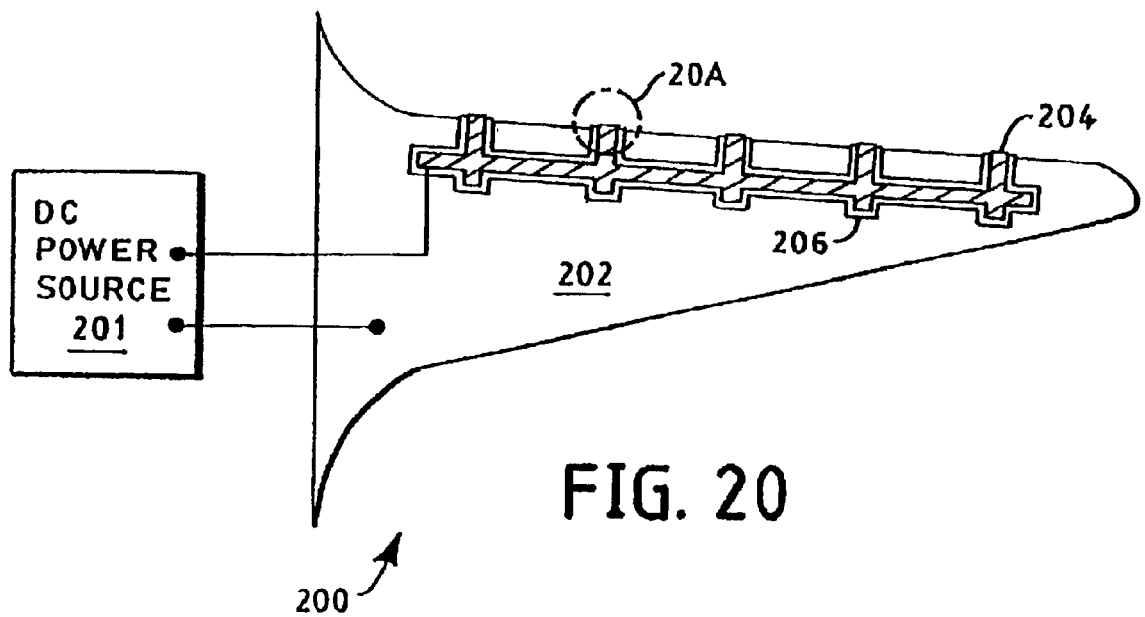
FIG. 20 illustrates one other embodiment of the invention for modifying ice adhesion strength of ice adhered to an aircraft wing.
Figure 20A:
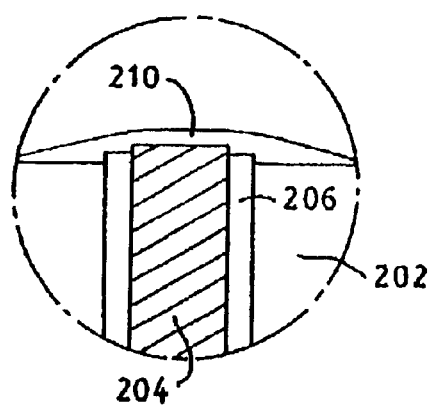

FIG. 20 illustrates one other system 200 used to de-ice an aircraft wing 202. A DC power source 201 supplies a DC bias to the wing 202, acting as the first electrode (the wing 202 is either conductive or coated with metal foil or conductive paint), and to a conductive grid 204 that is electrically insulated from the wing 202. The grid 204 is insulated from the wing 202 by an insulating film 206 disposed between the wing 202 and the grid 204. The grid 204 acts as the second electrode in the circuit of FIG. 20. When ice 210 forms on the wing 202, it bridges the circuit and the DC bias is applied to the interface between the wing 202 and the ice 210.

Figure 21:
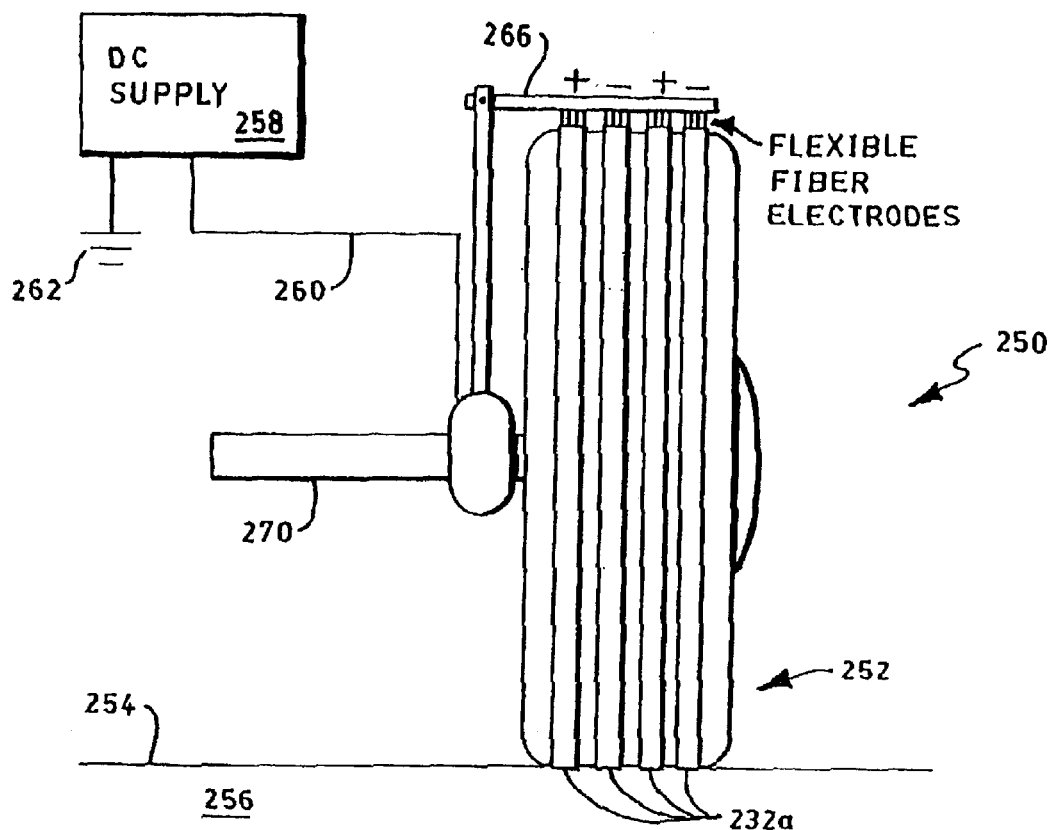
FIG. 21 schematically illustrates a system constructed according to the invention for modifying ice adhesion strength between an automobile tire and an icy road.

FIG. 21 illustrates a system 250 used to increase friction between an automobile tire 252 and ice 254 on the road 256. As shown, the tire 252 includes a plurality of strips 252a that are conductively doped (such as with iodine) to transmit a current. A DC power supply 258 connects to the strips 252a through cabling 260 and generates a DC bias relative to ground 262. The DC voltage differential generated by the supply 258 is between about 5V and 1000V (and is usually in the range 10V to 100V). The DC supply can also include voltage regulation circuitry and feedback subsystems (as discussed above) to determine the conductivity of the ice 254 (or snow) and to adjust the DC bias accordingly. A non-contact temperature sensor (not shown) can also be used to remotely sample the ice temperature, as known to those in the art, so that temperature can also be used as a feedback parameter.

Voltage is applied to the strips 252a by way of a electrical control lever 266. Alternating strips 252a can be driven with plus or minus potential through the supply 258, if desired, to acquire the highest adhesion for a given voltage range. The lever 266 can be moved up and out of the way when the system 250 is not in use (such as by an electro-mechanical controller). By connecting the supply 258 to the wheel axle 270, a constant distance is maintained between the lever 266 and the current source.

Those skilled in the art should appreciate that the strips 252a can be welded onto existing tires (or tire material) and that fewer or more strips 252a can be used. Indeed, the tire 252 can be entirely doped so as to become conductive wherein no strips are required.

Those skilled in the art should appreciate that circuitry such as presented in FIG. 18 can also be used in the tire system of FIG. 21. However, the DC and AC voltages in such an embodiment are applied to neighboring strips 252a (shown as + and − respectively) so as to decouple the two signals. The DC voltage applied between the strips 252a is small (about 10V) before an ice alarm is received; but is switched to high voltage of 100V to 1000V after the signal.

Figure 22:
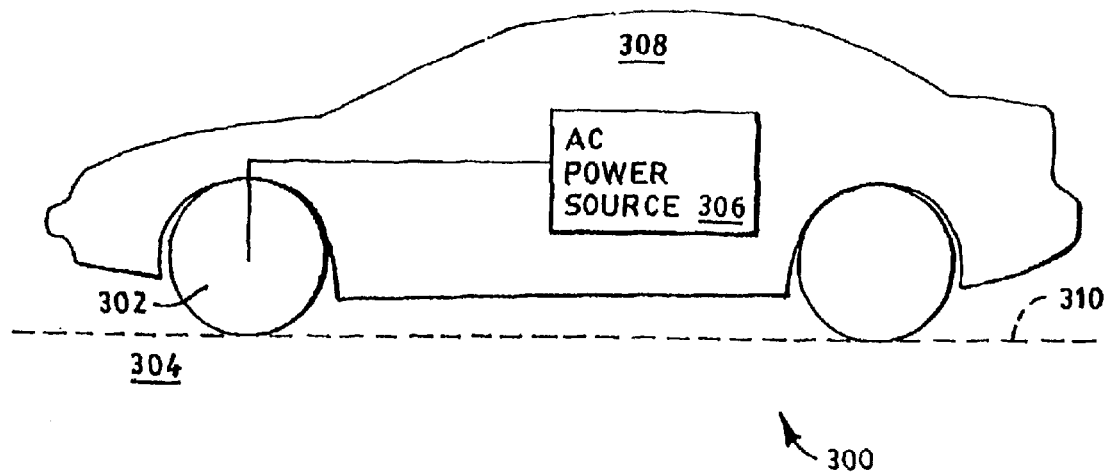
FIG. 22 shows one other system constructed according to the invention for imparting a voltage to the interface between an automobile tire and an icy surface for increasing the coefficient of friction therebetween.

FIG. 22 shows a system 300 that increases the friction between an automobile tire 302 and an icy road 304. The tire 302 is doped or manufactured so that current can flow through the rubber of the tire 302. An AC power source 306 is housed within the car 308 and is connected to the tire 302 through appropriate wiring 309 (the wiring is non-interfering with the wheel rotation, such by connection through the axle). The AC source 306 applies a high frequency (10–1000 kHz), high voltage signal to the tire 302; and that signal imparts a substantially DC voltage between the tire 302 and the road 304. That voltage is preferably of a magnitude which increases the friction between the ice 310 and the tire 302.

Figure 23:
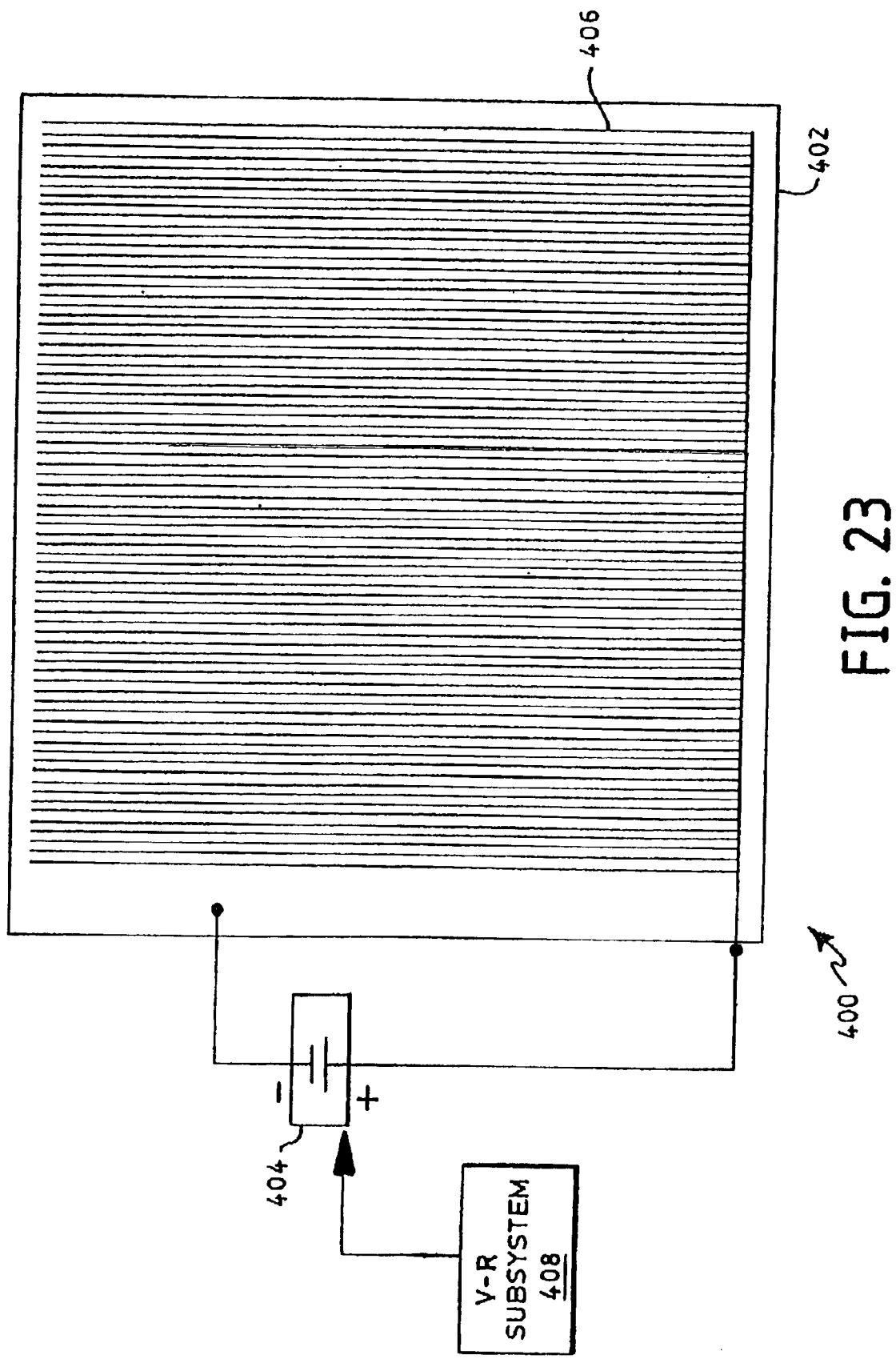
FIG. 23 illustrates a system for modifying ice adhered to a car windshield.

FIG. 23 shows a system 400 which includes a car window 402 connected in circuit with a DC source 404. The window material is doped (such as with ITO or fluoride doped $S_iO_2$) to become one conducting electrode of the system 400. The other electrode is a grid 406 formed by transparent conducting strips placed on the window 402 and electrically insulated by a insulating grid (not shown) between the grid 406 and the window 402. Preferably, a voltage regulator subsystem 408 such as described above monitors factors such as ice conductivity and temperature so as to determine when ice bridges the gap between the grid 406 and the window 402 (as compared to water) and further to bias the DC voltage applied to the interface between the ice and the window to a point of near-minimum ice adhesion. See, e.g., FIG. 4. The insulating grid beneath grid 406 is similar to the layer 144' of FIG. 19.

Note that the grid 406 is connected together such that each point on the grid 406 resides at a constant potential, preferably.

Figure 23A:
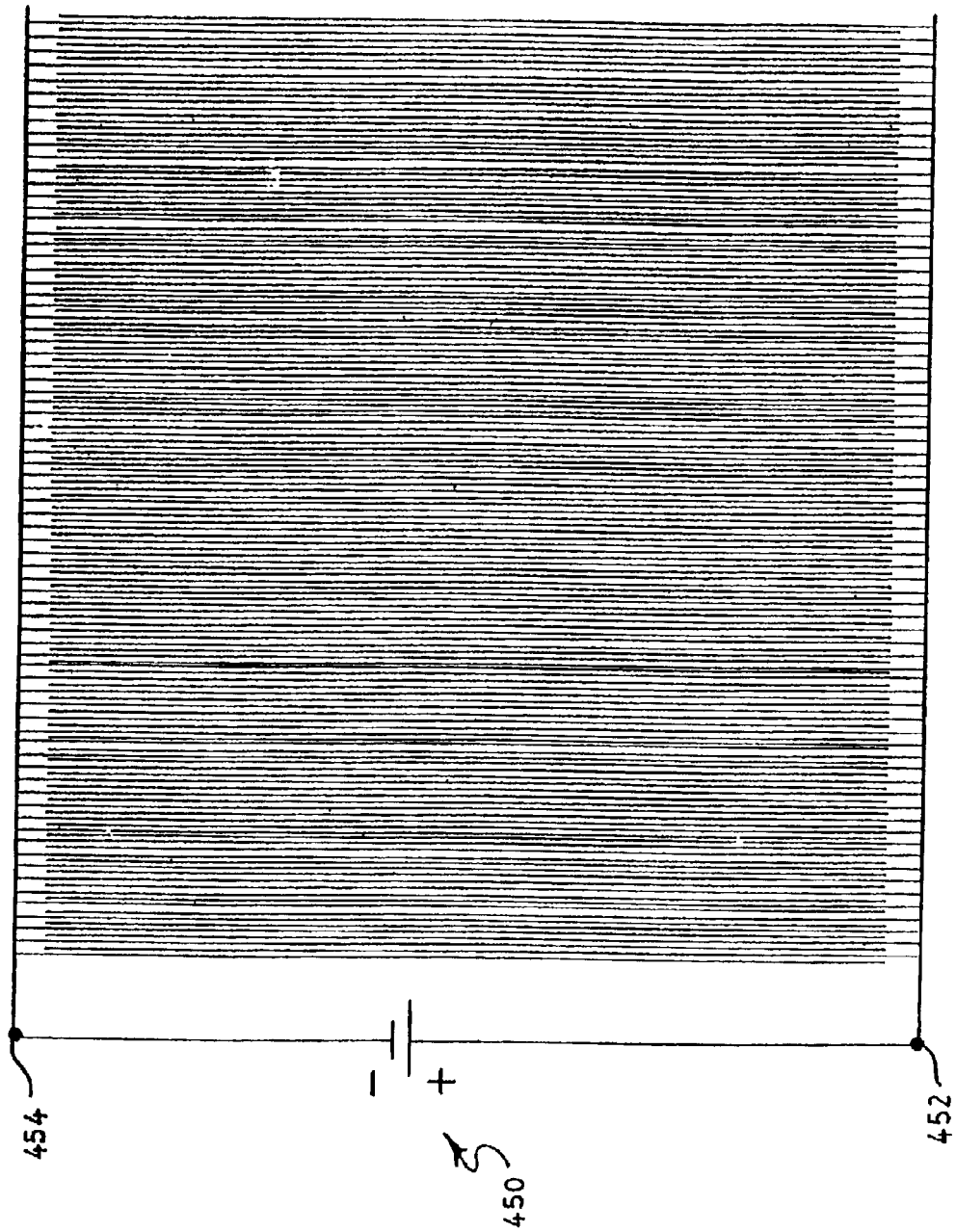
FIG. 23A shows an alternative embodiment.

An alternative window grid and electrode pattern is shown in FIG. 23A, which includes a DC source 450 connected to a first electrode 452 (coupled to a first grid) and to a second electrode 454 coupled to a second grid interleaved with the first grid. The system of FIG. 23A is an alternative embodiment as compared to FIG. 23; and can include additional circuitry and control such as described herein.

The anti-icing grid of FIGS. 23 and 23A is preferably made of conductive transparent coatings which are common in LCD and solar-cell technologies. DC voltages of 1–2V are typically applied to the comb-like grids of transparent conductive electrodes on the window. The desired bias can depend upon the electrode material and the manufacturer. The electrodes can be either painted or vapor-deposited on the windshield.

As discussed herein, it should be understood that car windshields can be doped with either ITO or fluoride doped $S_iO_2$, for example, to become an acceptable semiconductor (including transparency). Alternative transparent coatings include doped polyaniline. Lithium ion conductive glass might also be used. For automobile tires, copolymer-carbon deposits can be used within the rubber so as to conduct electricity. Iodine might also be used. Thin rubber films developed by CSIRO in Australia might also be used with the invention.

Figure 24:
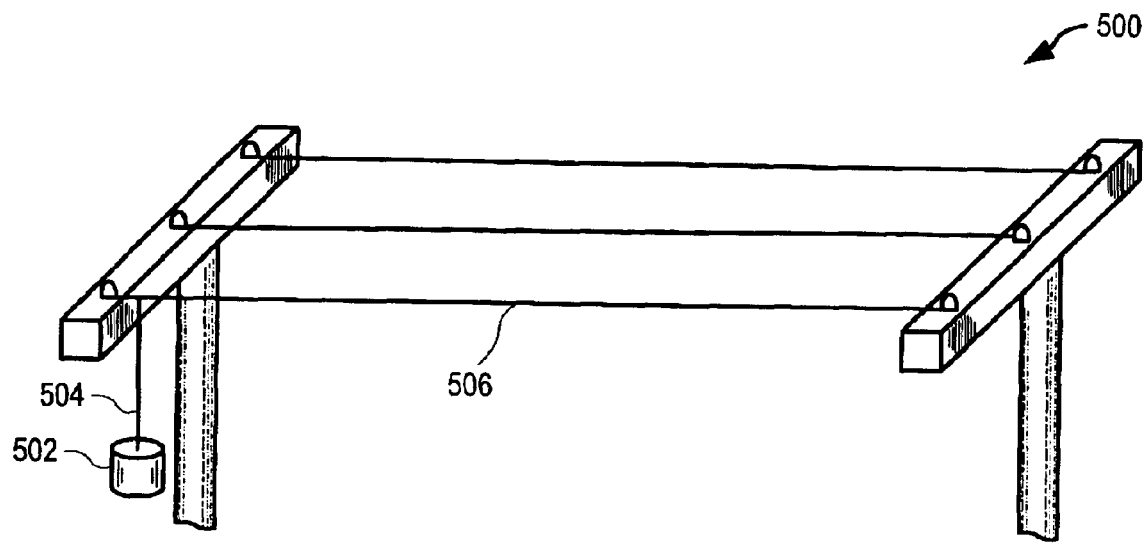
FIG. 24 shows one embodiment of the invention for reducing ice adhesion to power lines.
Figure 24A:
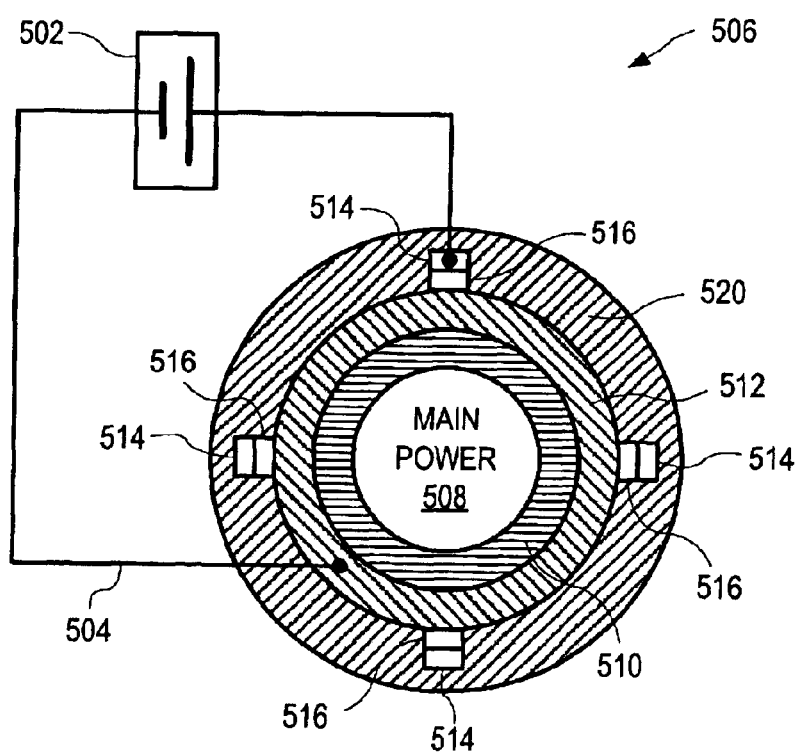
FIG. 24A illustrates a cross-sectional view (not to scale) of a power line constructed according to the invention.

FIG. 24 illustrates a power line ice control system 500 constructed according to the invention. The system includes a power control module 502 (including functionality such as DC power supply, and preferably voltage regulation and DC and AC ice detection and measurement as described herein) that is connected by wiring 504 to doped power line wiring 506. The wiring 506 is shown in an illustrative cross-sectional view (and not to scale) in FIG. 24A. The wiring 506 thus includes a main power line 508 and an insulating layer 510, both of which are known to those skilled in the art. A doped outer layer 512 surrounds the insulating layer 510 to provide ice control DC bias in circuit with the module 502. A conductive grid 514 axially extends (with optional circumferential winding) along the length of the wiring 506 and is electrically insulated from the layer 512 by an insulating grid 516 (also axially disposed) between the grid 514 and the layer 512. When ice 520 forms on the wiring 506, the ice 520 shorts the circuit and a DC bias applies to the interface between the layer 512 and the ice. By regulating the bias to the correct magnitude, the removal of ice 520 from the wiring 506 is facilitated.

Figure 25:
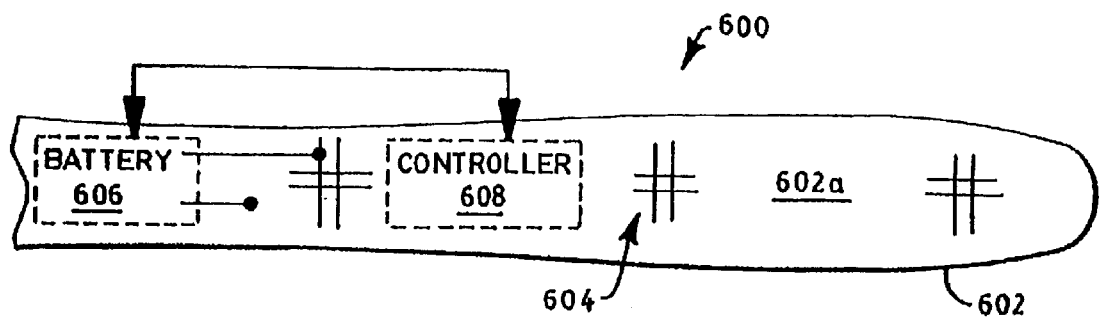
FIG. 25 shows an embodiment of the invention for altering the ice adhesion, selectively, to a ski so as to increase or decrease friction to snow and/or ice.

FIG. 25 shows a system 600 constructed according to the invention for modifying ice adhesion on a ski 602 so as to increase or decrease ski-to-snow/ice friction selectively. System 600 is shown with a view of the bottom 602a of the ski 602. A grid 604 (shown illustratively and including an electrically conducting grid spaced from the bottom 602a by an insulating grid, such as described herein) is provided on the bottom 602a as part of the circuit of system 600. A battery 606 connects to the grid 604 and to the bottom 602a and provides the DC bias to the circuit. A controller 608 senses ice conductivity (and optionally temperature) and regulates the bias generated by the battery 606. The ski bottom 602a is made from semiconductor material or is doped or lacquered with conductive strips. In contact with snow or ice, the controller controls the applied voltage and, thereby, the friction between the ski 602 and snow and ice.

Those skilled in the art should appreciate that the controller (and/or battery) are shown illustratively in FIG. 25 as dotted lines. Their physical location is a matter of design choice and may be on the top surface of the ski or in a boot pack or binding. In addition, the controller can be made responsive to user input to alter the friction in real time. For example, skiers climbing up an incline (such as in cross-country) can select "increased friction" and the system 600 will respond to do so. The user can also select "decreased friction" and the controller commands a bias that minimizes the ice adhesion strength of ice/snow to the bottom 602a.

Figure 26:
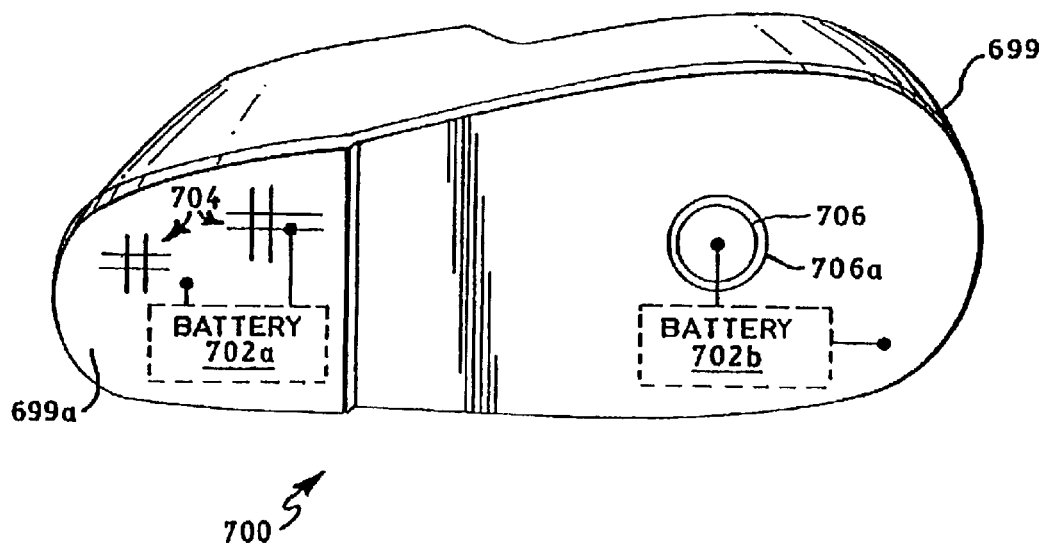
FIG. 26 illustrates a shoe heel and sole constructed according to the invention for increasing ice/snow adhesion to the sole and/or heel to increase shoe traction.

FIG. 26 shows yet another embodiment of the invention for modifying ice adhesion strength for ice/snow in contact with a sole of a shoe 699. Specifically, FIG. 26 shows a system 700 including a battery 702. For illustrative purposes only, there are two batteries 702 shown to illustrate two alternative electrode designs. In the first design, at the heel 699a (made conductive by techniques discussed herein and known to those in the art), the battery 702a connects to a conductive grid 704 such as described herein (and spaced from the conductive heel 699a). When in contact with snow or ice, the snow or ice bridges the circuit and a DC bias is applied to the ice-heel interface to increase friction.

The other design of FIG. 26 is shown illustratively in that a grid electrode is not really required for a small surface such as a shoe 699. Rather, a single electrode 706 may be sufficient (note that as above the electrode 706 is spaced from the sole by an insulating layer 706a. Here, the sole of the shoe is conductive (or made conductive through doping) so that when snow or ice contact the electrode 706, the circuit is completed and the optimum DC bias is applied from the battery 702b so as to increase shoe traction.

Figure 27:
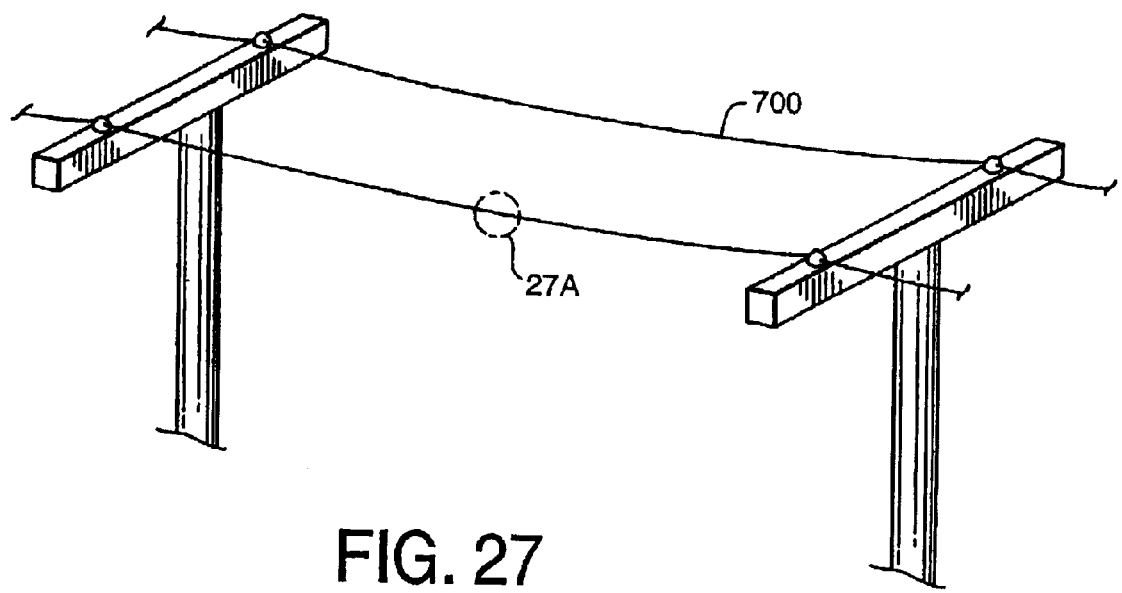
FIG. 27 illustrates one system of the invention for removing ice and snow from power lines through application of a coating on the power line.
Figure 27A:
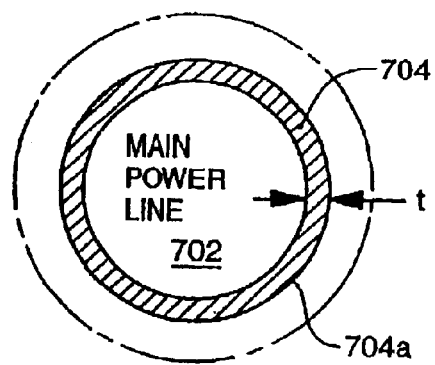

FIG. 27 shows one preferred embodiment of the invention suitable to reduce or remove ice from power lines 700. The inset to FIG. 27 shows a cross-sectional view of the power line 700 constructed according to the invention. As known in the art, the normal power line 702 generates power at 60 Hz but with very high E-fields such as 10,000 volts per inch. In accord with the invention, a coating 704 is applied over the line 702 at a thickness of "t".

In one embodiment, the coating 704 is a ferroelectric material, as known in the art. Ferroelectric materials are essentially ceramics that exhibit a very high dielectric constant (e.g., 10,000) and very high dielectric loss (e.g., tan $\delta \approx 10$) at certain conditions, and a relatively low dielectric constant (3–5) and small dielectric loss at other conditions. One condition that can change the constant is temperature. In a preferred aspect, the material is selected so that above freezing, the dielectric constant is low, and below freezing temperatures, the constant is high. When ambient temperature drops below the freezing point, the coating is intensively heated by the AC electric field due to the high dielectric constant and dielectric loss.

Those skilled in the art should appreciate that the above-described embodiment can be self-regulating in keeping the coating temperature close to (or slightly above) the melting point. If the coating is overheated by the power line's electric field, it automatically undergoes a phase transformation from the ferroelectric to the normal state, at which point the coating stops absorbing the electric field energy. By choosing a phase transition temperature, therefore, the coating temperature can be adjusted per user needs and per the environmental conditions of the local area.

The coating 704 generates heat in the presence of an AC field such as generated by the line 702. Specifically, it exhibits hysteresis that generates heat over the AC cycle; and the coating thus generates heat due to the oscillating E-field of the line 702.

The thickness "t" is typically on the order of 1/100 of an inch, though other thicknesses can be applied depending upon coating materials and desired heating. By changing the thickness, for example, temperatures at the surface 704a can be increased by 1–10 degrees, or more. The thickness "t" is chosen so that a desired amount of heat is generated (i.e., heat sufficient to generally melt ice and snow on the surface 704a of the line 700).

When the coating exhibits low dielectric constant and loss (i.e., when the coating is above "freezing" or some other desired temperature), much less heat is generated by the coating 704 and, thereby, much less energy is expended by the line 702.

The coating 704 can also be constructed by ferromagnetic materials with the same or similar effect. In this case, the coating absorbs the energy of the magnetic field generated by a power line.

More particularly, when a ferroelectric material is placed in an oscillating electric field (AC), the material is heated by the field due to a dielectric loss. The heating power per cubic meter is:

$$W = \frac{\omega \varepsilon \varepsilon_0}{4\pi} \tan\delta (\overline{E^2}) \quad (19)$$

where $\in'$ is a relative dielectric permittivity (usually $\in'$ is approximately $10^4$ for typical ferroelectrics), $\in_0$ is a dielectric permittivity of free space ($\in_0$=8.85E-12 F/m), $\omega$ is an angular frequency of the AC field ($\omega=2\pi f$, where f is a usual frequency for the power line, e.g., 60 Hz in conservative power lines), tan $\delta$ is the tangent of dielectric loss, and $(\overline{E^2})$ is the average of electric field squared.

Ferroelectrics are characterized with very large values of $\in'$ and tan $\delta$ below the so-called Curie Temperature, $T_c$, and small $\in'$ and tan $\delta$ above $T_c$. Thus, the dielectric loss (or heating power of the AC electric field) is very high below and close to $T_c$; and it drops by a large factor (e.g., $10^6$) above that temperature. This makes ferroelectrics with $T_c$ close to or just above the melting temperature an optimum choice for a coating 704 such as described above. Such coatings absorb the electric power when the outside temperatures drop below the melting point, $T_m$, and are heated by the field to a temperature above $T_m$ so that they again transform into usual insulators (i.e., no longer absorbing the electric field in significant quantity).

Accordingly, when such coatings are placed in an AC field, the ferroelectric material maintains a constant temperature which is close to $T_c$ and just above $T_m$. This self-adjusting mechanism to prevent icing is very economic: the maximum heating power per one meter of the power line, or per m² at any surface to be protected, can be increased or decreased by changing the coating thickness and/or by adding a neutral (not ferroelectric) insulating paint or plastic to the coating. Examples of suitable ferroelectric materials according to the invention include:

TABLE 3

Ferroelectric materials

| Name | Formula | $T_c$ (Kelvin) |
|---|---|---|
| Rochelle salt | NaKC$_4$H$_4$O$_6$ 4H$_2$O | 255–297 |
| Deuterated Rochelle salt | NaKC$_4$H$_2$ D$_2$O$_6$ 4H$_2$O | 251–308 |
| TGSe | (NH$_2$CH$_2$COOH)$_3$ H2Se)4 | 295 |
| Potassium tantalate niobate | KT$_{a2/3}$ N$_{b1/3}$ O$_3$ | 271 |
| Anti momium nitrate | NH$_4$NO$_3$ | 255, 305 |
| | Pb$_3$MgNb$_2$O$_8$ | ~273K (0 degrees C) |

By way of example, consider the heating power calculations for Pb$_3$MgNb$_2$O$_g$. In this example, a middle range power line is considered with $\sqrt{\overline{V^2}}$=10 kV and with a wire diameter of 1 cm=2*radius. The electric field strength on the wire surface is:

$$E \approx \frac{V}{\ln\left(\frac{L}{r}\right)*r} \approx 3\times 10^5 \frac{V}{m} \quad (20)$$

or 3 kV/cm, where L is the distance between the wires (L=1 m). Substitution as above, i.e., $\overline{E^2}$=3E5 V/m, $\omega=2\pi*60$ Hz, $\in'$=104 and tan $\delta$=10, computes to W (1 mm, 60 Hz)=4.5E5 watts/m³. A 1 mm thick film, for example, thus generates 450 watt/M², which is more than sufficient for typical melting of ice.

When applied to power lines, the maximum power that can be dissipated in the coating is limited by a capacitance $C_2$ between the wires:

$$W_{max} \approx \frac{\omega C_2}{2} \cdot \overline{V^2} \quad (21)$$

For wires of 2 cm thickness, with 1 m distance between wires, $C_2 \cong$1.21E-11 F/m. For a power line at V=350 kV, $W_{max} \cong$300 Watt/m, which is sufficient energy to keep a 1 m long cable free of ice.

In addition to ferroelectrics, almost any semiconductor coating will provide similar effects. To reach the maximum performance of Equation (21), the coating dielectric conductivity $\sigma$ should satisfy the condition:

$$\sigma \approx \in \in_0 \omega \quad (22)$$

where $\in$ is the coating's dielectric constant, and $\in_0$ is that of free space. For a 60 Hz line and $\in \approx$10, $\sigma \approx$3.4E-8 (ohm.m)$^{-1}$. Such conductivity is very typical for many undoped semiconductors and low-quality insulators. Thus, such a coating is not expensive (certain paints qualify for these coatings). Moreover, the same temperature "tuning"—described above—can be achieved due to a strong temperature dependence of conductivity of semiconductor materials (e.g., an exponential dependence). Thus, the optimal conditions according to Equation (22) are satisfied only in a narrow temperature interval, e.g., $-10°$ C.$\leq$T$\leq$10° C., where the coating will melt ice, otherwise consuming little power.

Those skilled in the art should appreciate that other surfaces such as described herein can also be treated with these coatings. For example, applying such a coating to an airplane wing will also provide melting capability by subjecting the coating to AC and, particularly, by increasing that AC as in Equation (19) above. By way of example, for $Pb_3MgNb_2O_g$, a frequency of 100 kHz will heat a 1 mm thick coating to W(1 mm, 100 kHz, 3E5V/m)=750 kWatt/m².

Figure 28:
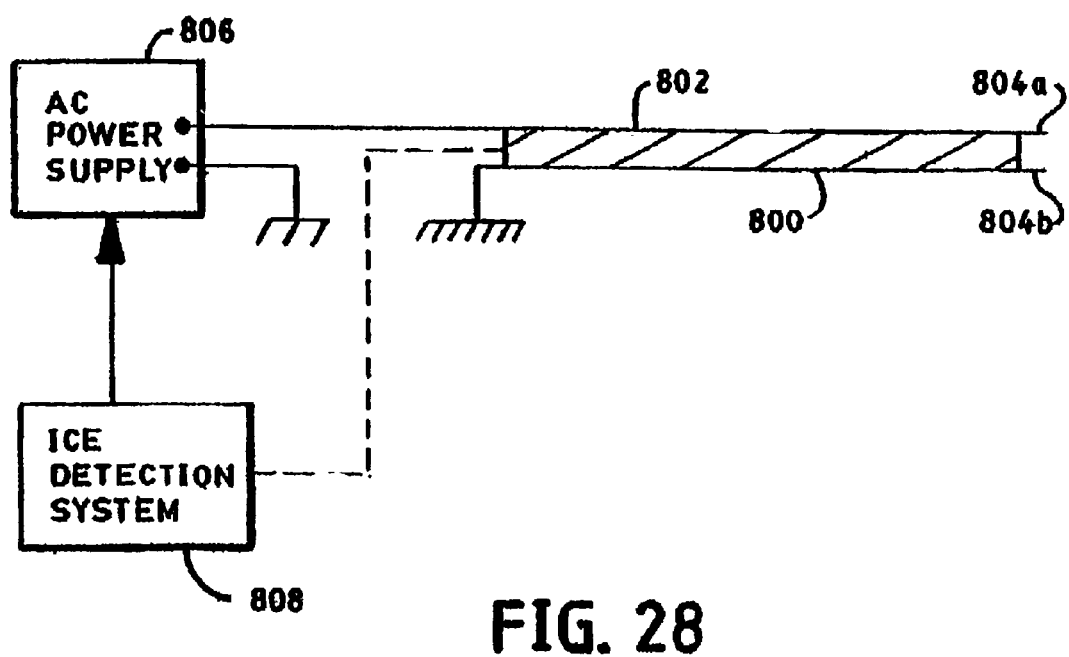
FIG. 28 illustrates application of a ferroelectric coating onto a non-active surface, in accord with the invention, to remove ice therefrom.

FIG. 28 illustrates an embodiment of the invention utilizing such coatings to de-ice non-active surfaces (i.e., those surfaces without internal AC e-fields). In FIG. 28, a ferroelectric coating 800 is applied to a structure 802 (e.g., an aircraft wing). Foil electrodes 804a, 804b provide for application of AC power to the structure 802. The AC power derives from a standard AC power supply 806. An ice detection system 808 (e.g., the detection system of FIG. 18), in circuit with the structure 802, preferably informs the power supply 806 of ice on the structure 802, whereinafter AC power is applied. The AC frequency and coating thickness are chosen to generate heat at the desired quantities (e.g., so as to keep icing from forming on an aircraft wing).

The invention thus attains the objects set forth above, among those apparent from preceding description. Since certain changes may be made in the above apparatus and methods without departing from the scope of the invention, it is intended that all matter contained in the above description or shown in the accompanying drawing be interpreted as illustrative and not in a limiting sense.

For example, those skilled in the art should appreciate that grid electrodes such as described in connection with FIG. 17 can also be applied to surfaces including the roof of a house, oil pipelines, driveways, and other areas prone to ice collection.

In view of the foregoing, what is claimed is:

1. In a power line of the type that provides power to different locales and is suspended above ground, the improvement to reduce or prevent ice, comprising a coating covering the surface of the power line, which coating, when subjected to an approximately radially directed AC field associated with an AC voltage on the power line, dissipates sufficient power through dielectric loss to generate sufficient heat to melt ice or prevent its formation, the AC voltage being not less than about 10 kV.

2. In a power line of claim 1, the further improvement wherein the coating has a thickness selected to correspond to a desired rate of heat generation by the coating.

3. In a power line of claim 1, the further improvement wherein the coating comprises a semiconductor material.

4. In a power line of claim 1, the further improvement wherein the heat generated from dissipated power of the dielectric loss changes as a function of ambient temperature.

5. In a power line of claim 1, the further improvement wherein the coating has a thickness in a range of about 0.2 mm to 1 mm.

6. In a power line of the type that provides power to different locales and is suspended above ground, the improvement to reduce or prevent ice, comprising a coating covering the surface of the power line, which coating, when subjected to an approximately radially directed AC field associated with an AC voltage on the power line, dissipates sufficient power through dielectric loss to generate sufficient heat to melt ice or prevent its formation, and an AC power source for providing AC power having a frequency in a range of about 15 Hz to 1000 Hz.

7. A method of reducing or preventing ice on a power line of the type that provides power to different locales and is suspended above ground, comprising steps of:

covering the power line with a coating, which, when subjected to an approximately radially directed AC field associated with an AC voltage on the power line, dissipates sufficient power through dielectric loss to generate sufficient heat to melt ice or prevent its formation; and applying AC power to the power line, in a frequency range of about 15 Hz to 1000 Hz, to generate the AC field in the coating.

8. A method as in claim 7, wherein the step of covering the power line comprises selecting a coating thickness to correspond to a desired dielectric loss heat.

9. A method as in claim 8, wherein the desired dielectric loss heat changes as a function of ambient temperature.

10. A method as in claim 7, wherein the step of covering comprises covering the power line with a semiconductor material.

11. A method of reducing or preventing ice on a power line of the type that provides power to different locales and is suspended above ground, comprising steps of:

covering the power line with a coating, which, when subjected to an approximately radially directed AC field associated with an AC voltage on the power line, dissipates sufficient power through dielectric loss to generate sufficient heat to melt ice or prevent its formation; and applying AC power to the power line, with a voltage of not less than 10 kV, to generate the AC field in the coating.

12. A power line, comprising:

a power source configured for supplying power having a frequency in a range of about 15 Hz to 1000 Hz; and a power line coating connected to the power source for receiving the power of the power source to substantially dissipate ice from the power line.

13. The power line of claim 12, the power line coating comprising a dielectric for controllably absorbing the power and converting the power to heat through dielectric losses.

14. The power line of claim 12, further comprising AC power distributed through the power line.

15. The power line of claim 12, further comprising AC power externally distributed from the power line.

16. A power line, comprising:

a power source configured for supplying power; and a power line coating, connected to the power source for receiving the power of the power source to substantially dissipate ice from the power line, comprising a dielectric for controllably absorbing the power and converting the power to heat through dielectric losses, wherein the dielectric having permittivity in a range of approximately 3 to 5 relative to a frequency of the power before ice forms on the power line.

17. A power line, comprising:

a power source configured for supplying power; and a power line coating, connected to the power source for receiving the power of the power source to substantially dissipate ice from the power line, comprising:

an insulator connected to the power line; and conductive elements connected to the insulator for substantially dissipating the ice as the ice electrically couples the conductive elements to the power source.

18. The power line of claim 17, the power line coating comprising a dielectric for controllably absorbing the power and converting the power to heat through dielectric losses.

19. The power line of claim 18, the dielectric comprising a permittivity having a range of approximately 3 to 5 relative to a frequency of the power before ice forms on the power line.

* * * * *